(12) United States Patent
Wang et al.

(10) Patent No.: US 11,014,111 B2
(45) Date of Patent: May 25, 2021

(54) SANITARY EQUIPMENT AND CONTROL METHOD THEREOF

(71) Applicants: Wei-Jun Wang, Taipei (TW); Ruei-Hong Hong, Taipei (TW); Wen-Yi Chiu, Taipei (TW); Po-Chun Liu, Taipei (TW); Chia-Shin Weng, Taipei (TW); Shi-Kuan Chen, Taipei (TW)

(72) Inventors: Wei-Jun Wang, Taipei (TW); Ruei-Hong Hong, Taipei (TW); Wen-Yi Chiu, Taipei (TW); Po-Chun Liu, Taipei (TW); Chia-Shin Weng, Taipei (TW); Shi-Kuan Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 154 days.

(21) Appl. No.: 16/140,544

(22) Filed: Sep. 25, 2018

(65) Prior Publication Data
US 2019/0091711 A1 Mar. 28, 2019

Related U.S. Application Data

(60) Provisional application No. 62/563,058, filed on Sep. 25, 2017.

(51) Int. Cl.
*B05B 12/00* (2018.01)
*G05D 7/06* (2006.01)
(Continued)

(52) U.S. Cl.
CPC .............. *B05B 12/00* (2013.01); *E03C 1/057* (2013.01); *E03D 5/105* (2013.01); *E03D 9/08* (2013.01); *E03D 11/12* (2013.01); *G05D 7/0617* (2013.01)

(58) Field of Classification Search
CPC .. E03D 5/04; E03D 9/08; E03D 11/12; A47K 13/10
(Continued)

(56) References Cited

U.S. PATENT DOCUMENTS 2,332,111 A * 10/1943 Porter .................... A47K 13/10
4/233
2005/0133754 A1* 6/2005 Parsons .................. E03D 5/105
251/129.17
(Continued)

FOREIGN PATENT DOCUMENTS

CN 203878695 10/2014
CN 104586310 5/2015
(Continued)

OTHER PUBLICATIONS

"Office Action of Taiwan Counterpart Application," dated Feb. 25, 2019, p. 1-p. 11.
(Continued)

*Primary Examiner* — Lauren A Crane
(74) *Attorney, Agent, or Firm* — JCIPRNET

(57) ABSTRACT

A sanitary equipment and a control method thereof are provided. The sanitary equipment includes a main body having an opining, a cover body movably disposed at the main body, an electric motor driving the cover body to move, an auxiliary apparatus disposed at the main body and a control circuit coupled to the electric motor and the auxiliary apparatus. In response to operation or wireless remote control, the control circuit controls the electric motor to drive the cover body to open the opening and turn on the auxiliary apparatus in a first process. In a second process, the control circuit controls the electric motor to drive the cover body to close the opening, and turns off the auxiliary apparatus at the same time. Sequences, numbers of steps of the first process and the second process are different.
(Continued)

Accordingly, the sanitary equipment with multiple functions and convenient use is provided.

20 Claims, 27 Drawing Sheets

(51) Int. Cl.
*E03D 9/08* (2006.01)
*E03C 1/05* (2006.01)
*E03D 11/12* (2006.01)
*E03D 5/10* (2006.01)

(58) Field of Classification Search
USPC ................................................ 4/443, 223
See application file for complete search history.

(56) References Cited

U.S. PATENT DOCUMENTS

2007/0132596 A1* 6/2007 Green .................... A47K 13/30
340/573.1
2017/0254059 A1* 9/2017 Shen ....................... B65F 7/005
2018/0055295 A1* 3/2018 Wei ........................... E03D 5/04

FOREIGN PATENT DOCUMENTS

| CN | 106836412 | 6/2017 |
| JP | 2005207072 | 8/2005 |
| TW | M470635 | 1/2014 |
| TW | 201540243 | 11/2015 |
| TW | 201709860 | 3/2017 |
| TW | M539900 | 4/2017 |

OTHER PUBLICATIONS

"Office Action of China Counterpart Application", dated Mar. 13, 2020, p. 1-p. 11.

"Office Action of China Counterpart Application", dated Nov. 2, 2020, p. 1-p. 10.

* cited by examiner

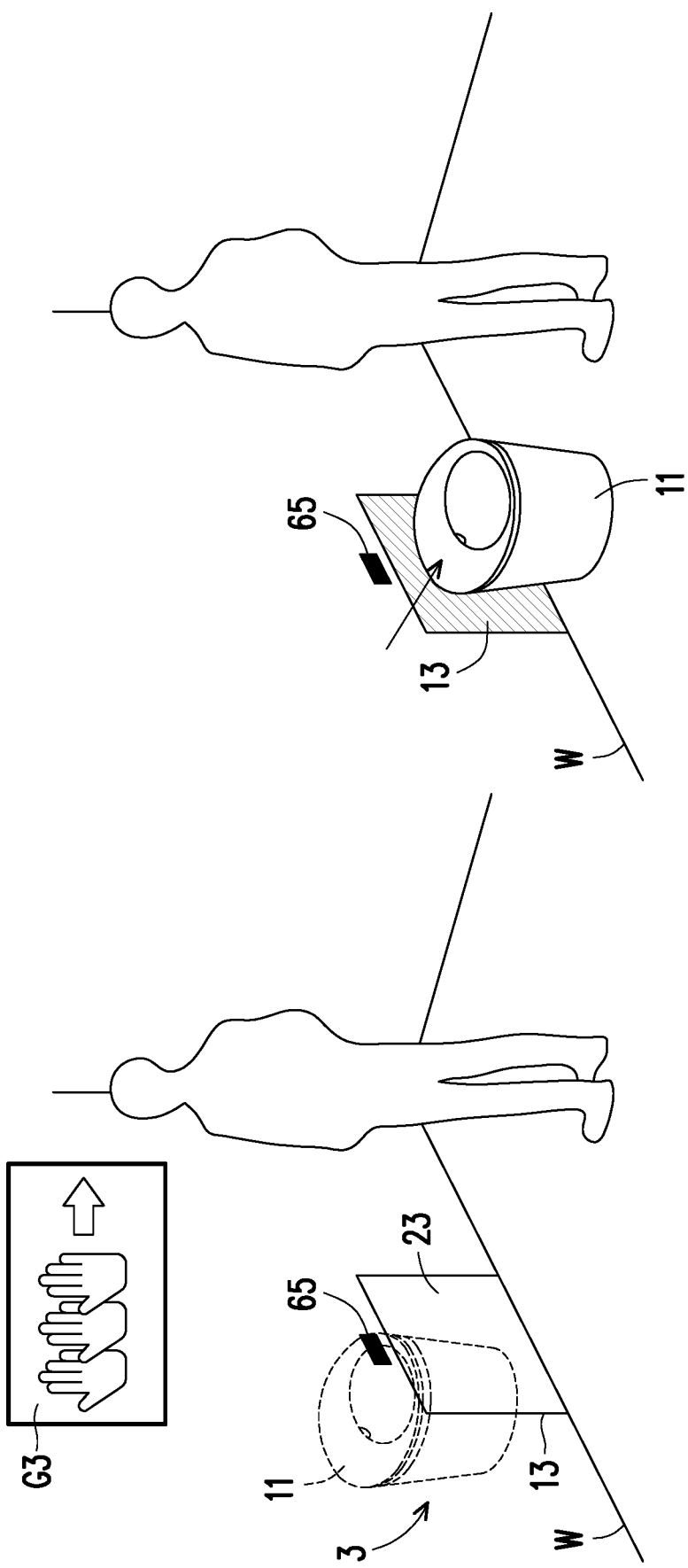

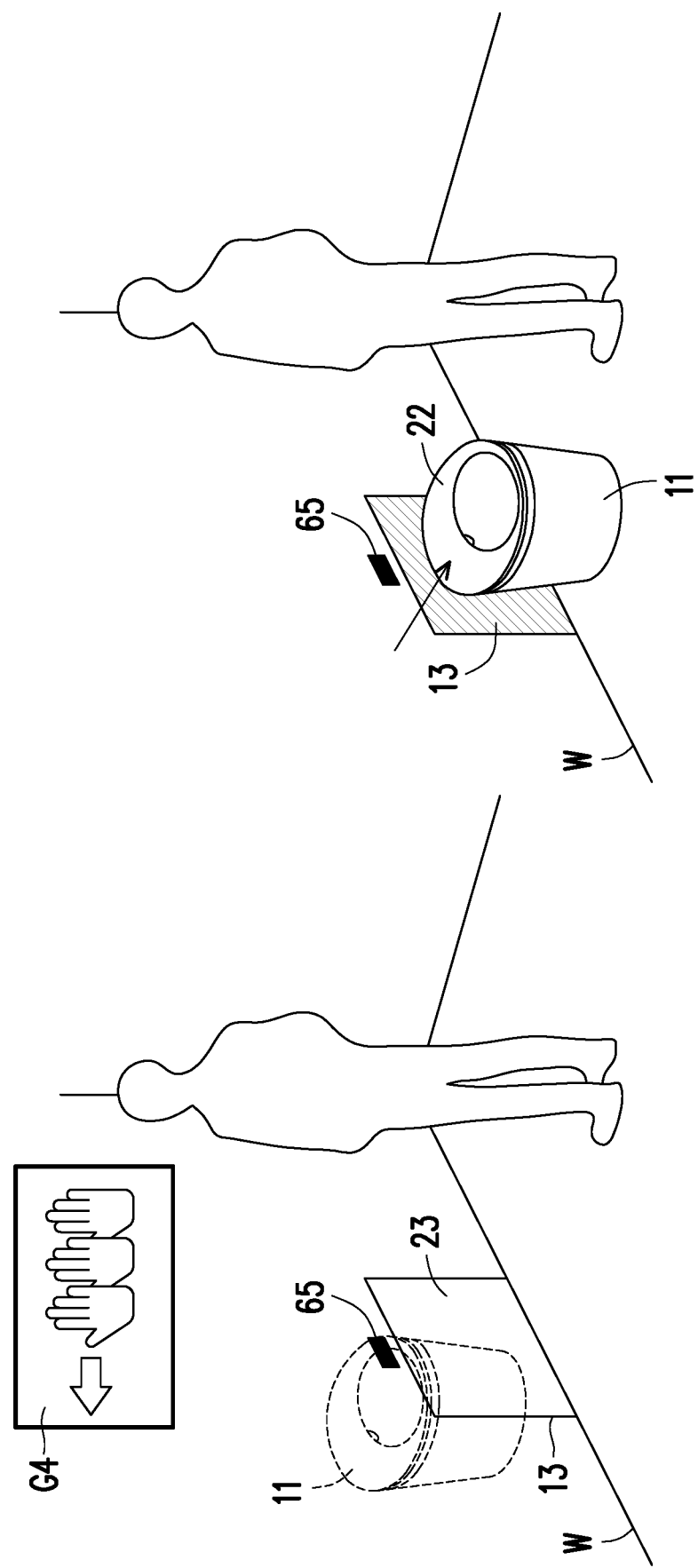

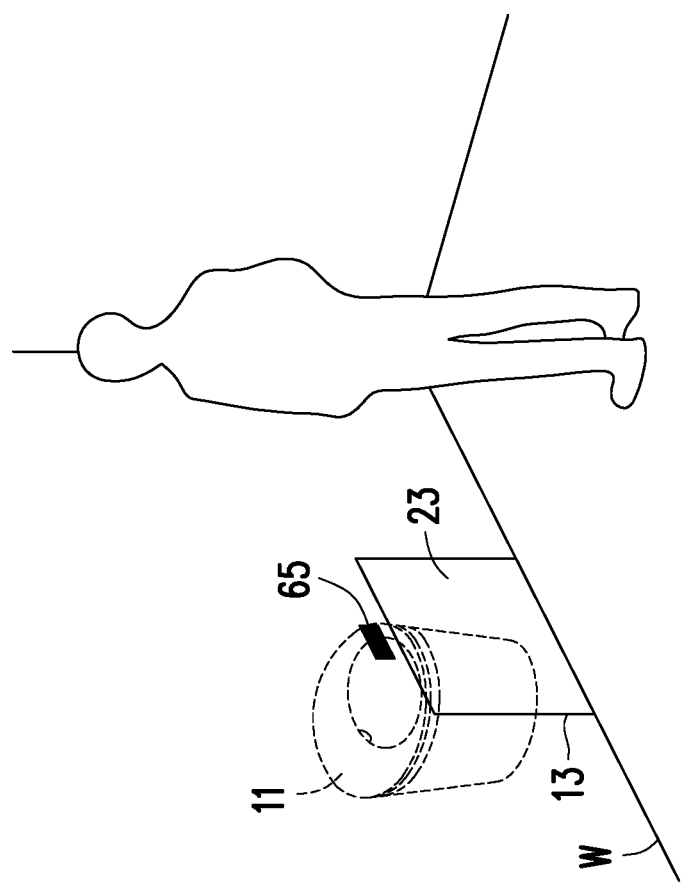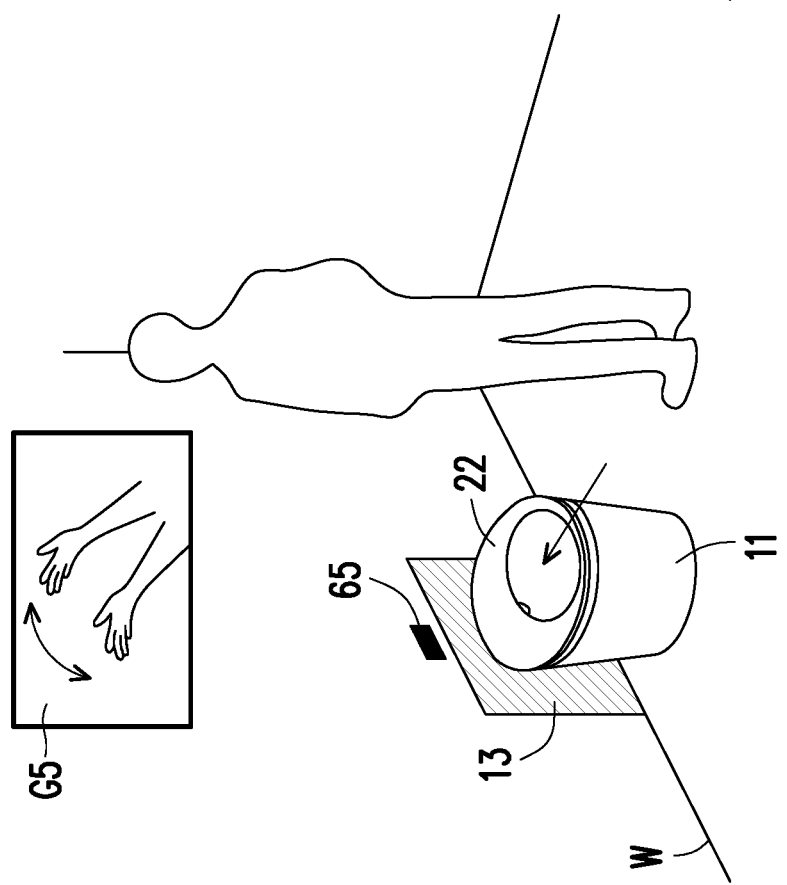
FIG. 11E
FIG. 11F

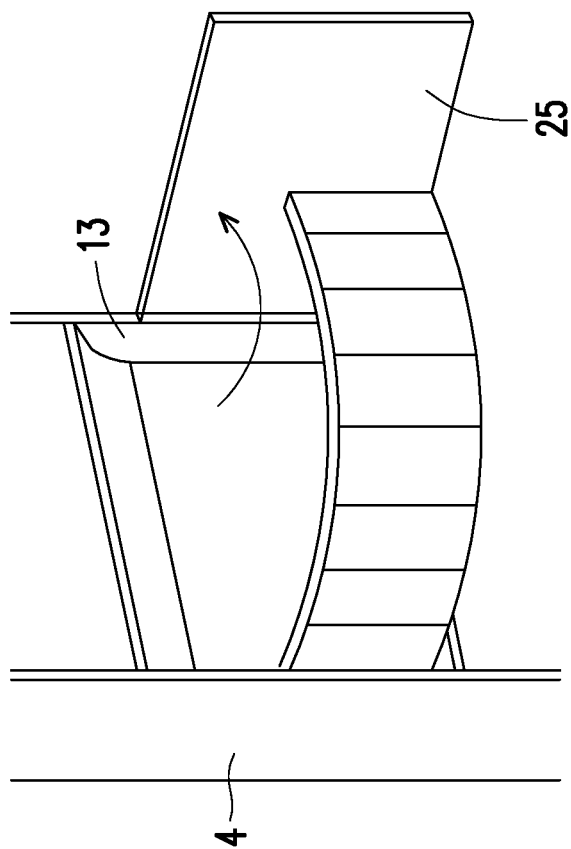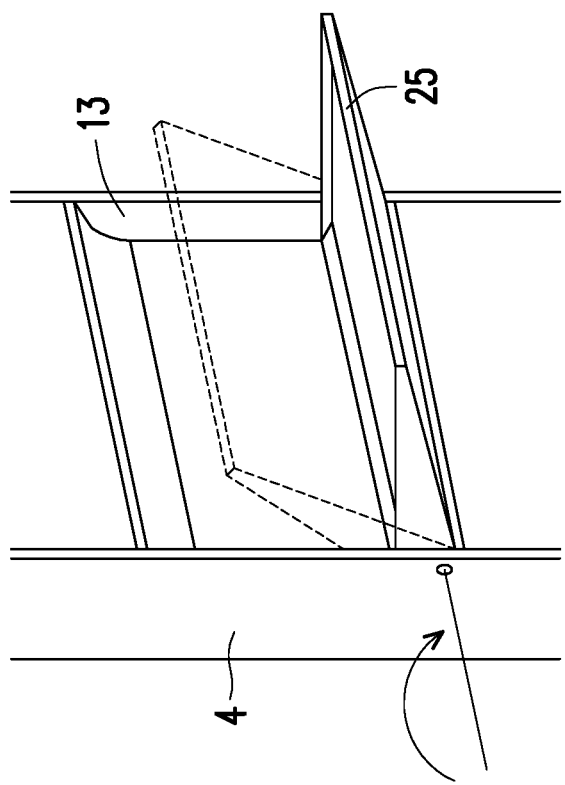
FIG. 14F
FIG. 14E

SANITARY EQUIPMENT AND CONTROL METHOD THEREOF

CROSS-REFERENCE TO RELATED APPLICATION

This application claims the priority benefit of U.S. provisional application Ser. No. 62/563,058, filed on Sep. 25, 2017. The entirety of the above-mentioned patent application is hereby incorporated by reference herein and made a part of this specification.

BACKGROUND OF THE DISCLOSURE

Field of the Disclosure

The disclosure relates to sanitary equipment, and particularly relates to sanitary equipment with multiple functions and automatic operation and a control method thereof.

Description of Related Art

Modern people have used to use sanitary equipment such as toilets, urinals, hand basins, etc., and water is provided through the sanitary equipment to wash away excrement or wash objects or bodies. Most of the sanitary equipment has little difference in appearance, and functions thereof are almost the same, or even occupy part of the space. Therefore, there is a need to provide innovative functions and breakthrough changes to the existing sanitary equipment.

SUMMARY OF THE DISCLOSURE

The disclosure is directed to sanitary equipment and a control method thereof, which provide users with ability to automatically control the sanitary equipment, and allows the users to use the sanitary equipment in a relaxed and pleasant atmosphere.

The disclosure provides sanitary equipment at least including but not limited to a main body, a cover body, an electric motor, an auxiliary device and a control circuit. The main body has an opening. The cover body is movably disposed on the main body. The electric motor is adapted to drive the cover body to move. The auxiliary device is disposed in the main body. The control circuit is disposed in the main body, and is coupled to the electric motor and the auxiliary device. The control circuit controls the electric motor to drive the cover body to open the opening, and then turns on the auxiliary device. Moreover, the control circuit controls the electric motor to drive the cover body to close the opening, and meanwhile turns off the auxiliary device.

In an embodiment of the disclosure, the sanitary equipment further includes a wireless communication receiver. The wireless communication receiver is coupled to the control circuit, and receives a wireless command signal.

In an embodiment of the disclosure, the wireless communication receiver generates a detection signal to the control circuit after receiving the wireless command signal.

In an embodiment of the disclosure, the sanitary equipment further includes a motion sensor. The motion sensor is coupled to the control circuit, and detects a motion of an object.

In an embodiment of the disclosure, the motion sensor is disposed in the main body.

In an embodiment of the disclosure, the cover body is a horizontal open-close cover body.

In an embodiment of the disclosure, the horizontal open-close cover body is a rotary cover body or a sliding cover body.

In an embodiment of the disclosure, the sanitary equipment further includes a cover body detection element. The cover body detection element is coupled to the control circuit, and is configured to detect movement of the cover body.

In an embodiment of the disclosure, the cover body detection element generates a cover body moving signal to the control circuit after detecting the movement of the cover body.

In an embodiment of the disclosure, the sanitary equipment further includes a pressure sensor. The pressure sensor is coupled to the control circuit, and is configured to detect an external force on the cover body.

In an embodiment of the disclosure, the pressure sensor generates a pressure sensing value to the control circuit after detecting the external force on the cover body.

In an embodiment of the disclosure, the auxiliary device comprises at least one of a fragrance dispenser and a loudspeaker.

In an embodiment of the disclosure, the sanitary equipment further includes a water supply device. The water supply device is coupled to the control circuit, and is configured to supply water into the main body.

In an embodiment of the disclosure, the sanitary equipment further includes a disinfection device. The disinfection device is coupled to the control circuit.

In an embodiment of the disclosure, the cover body comprises a toilet lid and a toilet seat.

In an embodiment of the disclosure, a range of an included angle between a detection direction of the motion sensor and a ground vertical line is 10-80 degrees.

In an embodiment of the disclosure, the disinfection device is disposed in the toilet lid.

In an embodiment of the disclosure, when the opening is closed by the toilet lid and the toilet seat, the disinfection device faces the toilet seat.

In an embodiment of the disclosure, the disinfection device is an ultraviolet disinfection lamp.

In an embodiment of the disclosure, the fragrance dispenser is an oily fragrance dispenser. The oily fragrance dispenser is configured to provide an oily aromatic film on a water surface inside the main body.

The disclosure provides a control method of sanitary equipment, which includes following steps. A main body, a cover body, an electric motor and an auxiliary device are provided. The main body has an opening. The cover body is movably disposed on the main body. The electric motor is configured to drive the cover body to move. The auxiliary device is disposed in the main body. A first process is executed, and the first process includes controlling the electric motor to drive the cover body to open the opening, and then turning on the auxiliary device. A second process is executed, and the second process includes controlling the electric motor to drive the cover body to close the opening, and meanwhile turning off the auxiliary device. Sequences and numbers of steps of the first process and the second process are different.

In an embodiment of the disclosure, the control method of the sanitary equipment includes following steps. A wireless communication receiver is provided, and the wireless communication receiver is configured to receive a wireless command signal. A detection signal is generated according to the wireless command signal. A control signal is generated according to the detection signal. The electric motor is controlled by the control signal to drive the cover body to open or close the opening.

In an embodiment of the disclosure, the control method of the sanitary equipment includes following steps. A motion sensor is provided, and the motion sensor is configured to detect a motion of an object. A detection signal is generated according to the motion of the object. A control signal is generated according to the detection signal. The electric motor is controlled by the control signal to drive the cover body to open or close the opening.

In an embodiment of the disclosure, the first process includes following steps. A cover body detection element is provided, the cover body detection element is configured to detect movement of the cover body. It is detected that the movement of the cover body is to open the opening. Then, the auxiliary device is turned on.

In an embodiment of the disclosure, the auxiliary device includes a fragrance dispenser, the step of turning on the auxiliary device in the first process includes a following step. An aromatic or deodorant is sprayed in a single or intermittent manner through the fragrance dispenser.

In an embodiment of the disclosure, the auxiliary device includes a loudspeaker, and the step of turning on the auxiliary device in the first process includes a following step. Music or sound is continuously played through the loudspeaker.

In an embodiment of the disclosure, the control method of the sanitary equipment includes following steps. A pressure sensor is provided, and the pressure sensor is configured to detect an external force on the cover body. The external force on the cover body is detected to generate a pressure sensing value. The motion sensor is stopped or turned off according to the pressure sensing value.

In an embodiment of the disclosure, the second process further includes following steps. A water supply device is provided. It is detected that the movement of the cover body is to close the opening. The water supply device is then turned on to supply water into the main body.

In an embodiment of the disclosure, the second process further includes following steps. A disinfection device is provided. It is determined that the water supply device is turned on. The disinfection device is then turned on for disinfection.

In an embodiment of the disclosure, the cover body includes a toilet lid and a toilet seat. The detection signal includes a gesture waving signal and a multi-gesture or multi-finger gesture waving signal.

In an embodiment of the disclosure, in the first process, when the detection signal is a single-gesture or a single-finger gesture waving signal, the electric motor drives the toilet lid to open the opening, though the toilet seat is remained stationary.

In an embodiment of the disclosure, in the first process, when the detection signal is a multi-gesture waving signal, the electric motor drives the toilet lid and the toilet seat to open the opening.

In an embodiment of the disclosure, the fragrance dispenser is an aromatic essential oil provider, and the step of turning on the auxiliary device includes following steps. Aromatic essential oil is sprayed inside the main body. An oily aromatic film is formed on a water surface inside the main body.

In an embodiment of the disclosure, the second process further includes following steps. A fecal flushing device is provided. Another detection signal is generated according to a motion of the object. Another control signal is generated according to the another detection signal. The electric motor is controlled by the another control signal to drive the toilet lid to close the opening. It is confirmed that the toilet lid is closed to the opening. Then, the fecal flushing device is turned on to flush water inside the main body.

In an embodiment of the disclosure, the another detection signal in the second process includes a single-gesture or single-finger gesture waving signal.

In an embodiment of the disclosure, the second process further includes following steps. A urine flushing device is provided. Another detection signal is generated according to a motion of the object. Another control signal is generated according to the another detection signal. The electric motor is controlled by the another control signal to drive the toilet lid to close the opening. It is confirmed that the toilet lid is closed to the opening. Then, the urine flushing device is turned on to flush water inside the main body.

In an embodiment of the disclosure, the another detection signal in the second process includes a single-gesture or single-finger gesture waving signal.

In an embodiment of the disclosure, the second process further includes following steps. A disinfection device is provided. The disinfection device is disposed in the toilet lid. It is confirmed that the toilet lid is closed to the opening, and the disinfection device faces the toilet seat. Then, the disinfection device is turned on to disinfect the toilet seat.

In an embodiment of the disclosure, the disinfection device is an ultraviolet disinfection lamp, and the ultraviolet disinfection lamp is configured to provide ultraviolet light to irradiate the toilet seat.

According to the above descriptions, the sanitary equipment and the control method thereof in the embodiments of the disclosure are adapted to control the electric motor, the loudspeaker, the fragrance dispenser, water flushing and even disinfection through motion sensing of a user or wireless remote control. In order to cope with an actual operation situation of the user and provide a more intelligent automatic process, a turning on/off timing of the loudspeaker and the fragrance dispenser is adjusted, the situation that user closing the toilet lid, the toilet seat and/or a sink cover, etc., by mistake during a usage process can be avoided, a water flushing timing is adjusted, and the toilet seat and the toilet lid may be simultaneously opened according to an actual requirement. Since the cover body may horizontally and movably shield the opening, the toilet or a sink body may be hidden when not in use without occupying an environmental space.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIGS. 11A to 11F are schematic diagrams of operating the toilet according to a third embodiment of the disclosure.

FIGS. 14A to 14F are schematic diagrams of operating the water sink according to the fourth embodiment of the disclosure.

DESCRIPTION OF EMBODIMENTS

Figure 1:
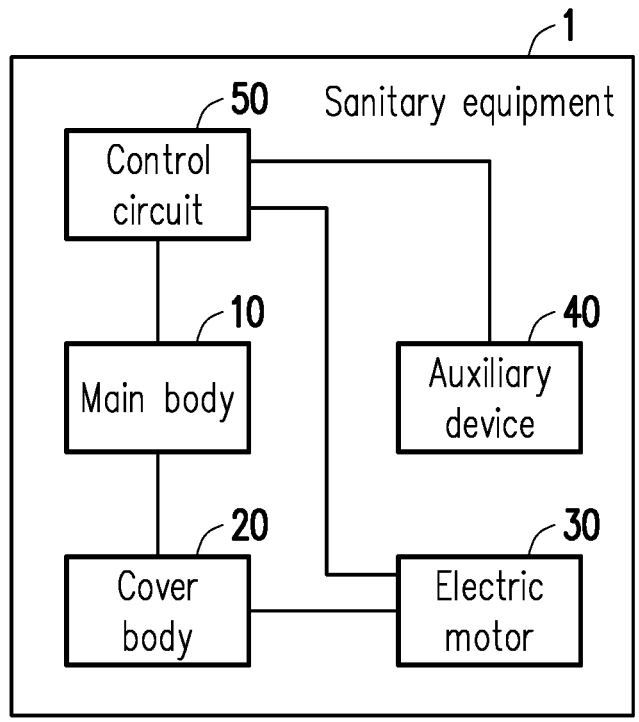
FIG. 1 is a component block diagram of sanitary equipment according to an embodiment of the disclosure.

FIG. 1 is a component block diagram of sanitary equipment 1 according to an embodiment of the disclosure. The sanitary equipment 1 may be a toilet, a sink, a urinal a bathtub, etc., the sanitary equipment 1 at least includes but not limited to a main body 10, a cover body 20, an electric motor 30, an auxiliary device 40 and a control circuit 50.

The main body 10 may be a toilet main body, a sink body, a urinal body, or a main body of any other sanitary equipment. The main body 10 has an opening, and a shape and a size thereof may be adjusted according to an actual requirement.

The cover body 20 may be a toilet lid, a toilet seat, a sink top cover, a bathtub cover, etc., and is movably disposed on the main body 10 (for example, through a slide rail, a pivot base, etc.). In the embodiment, the cover body 20 is used for shielding the opening of the main body 10.

The electric motor 30 may be various types of electric motor such as a servomotor, a linear motor, a stepper motor, etc. In the embodiment, the electric motor 30 is used for driving the cover body 20 to move (for example, to rotate, move, lift/descend, etc.).

The auxiliary device 40 is disposed in the body 10, and is, for example, a fragrance dispenser, a loudspeaker (or a speaker), a display device (for example, an LCD, an LED screen, etc.), other device adapted to provide sensory experiences such as a visual, an auditory, an olfactory experiences, or a combination thereof.

The control circuit 50 may be a processing unit such as a CPU, a microcontroller, a chip, an Application Specific Integrated Circuit (ASIC), a Field Programmable Gate Array (FPGA), etc., the control circuit 50 is coupled to the electric motor 30 and the auxiliary device 40, so as to control starting, closing or other functions (for example, a driving direction, an activation time, etc.) of the electric motor 30 and the auxiliary device 40.

The cover body 20 of the sanitary equipment 1 may be controlled by the control circuit 50 to automatically open or close the opening of the main body 10. Moreover, the sanitary equipment 1 of the embodiment of the disclosure additionally provides the auxiliary device 40 for enhancing a use atmosphere. If control timings of these devices or mechanism components may be properly adjusted, a usage experience is improved. The control circuit 50 of the embodiment of the disclosure is configured to respectively control the electric motor 30 and the auxiliary device 40 through two processes.

Figure 2:
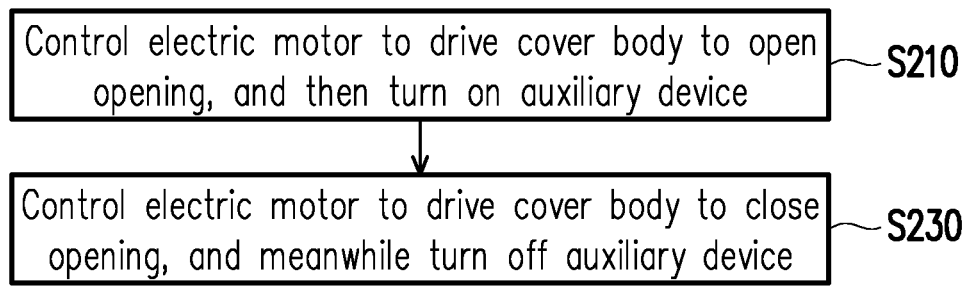
FIG. 2 is a flowchart illustrating a control method of the sanitary equipment according to an embodiment of the disclosure.

In order to facilitate understanding of an operation flow of the embodiment, the operation flow is described with reference of the devices and the mechanism components of the sanitary equipment 1 of FIG. 1. FIG. 2 is a flowchart illustrating a control method of the sanitary equipment 1 according to an embodiment of the disclosure. Referring to FIG. 2, the control circuit 50 executes a first process. In the first process, the control circuit 50 controls the electric motor 30 to drive the cover body 20 to open the opening, and then turns on the auxiliary device 40 (step S210). Specifically, the control circuit 50 controls the electric motor 30 to drive the cover body 20 to move (for example, to horizontally move, rotate, lift, descend, etc.) toward a first position, and in response to that the cover body 20 is moved to the first position, the control circuit 50 turns on the auxiliary device 40. To be further specific, the auxiliary device 40 is mainly used for allowing the user to obtain additional visual, auditory, or olfactory experiences while using the sanitary equipment 1, and a part of the auxiliary device 40 probably requires a material (for example, aromatic, deodorant, etc.) or consumes power. Therefore, only after the cover body 20 is opened or moved to a specific position (i.e. the opening of the main body 10 is exposed to a certain extent), the control circuit 50 turns on the auxiliary device 40, so as to avoid unnecessary resource waste. Therefore, the first process is adapted to a process before the user uses the sanitary equipment 1. Moreover, it should be noted that, the first position is a certain position of the cover plate 20 between a position of the cover body 20 completely closing the opening of the main body 10 and a position of the cover body 20 completely opening the opening, which may be adjusted by the user according to an actual requirement.

After the cover body 20 opens the opening of the main body 10, the control circuit 50 executes a second process (different in sequences and numbers of steps) different to the first process. In the second process, the control circuit 50 controls the electric motor 30 to drive the cover body 20 to close the opening, and meanwhile turns off the auxiliary device 40 (step S230). Specifically, the control circuit 50 controls the electric motor 30 to drive the cover body 20 to move (for example, to horizontally move, rotate, lift, descend, etc.) toward a second position different to the first position, and meanwhile/synchronously turns off the auxiliary device 40. To be further specific, in order to achieve environmental protection and energy saving, and it is assumed that at the moment when the user closes the cover body 20, the user has completed using the sanitary equipment 1, the auxiliary device 40 is turned off along with close of the opening of the main body 10. Therefore, the second process is adapted to a flow after the user uses the sanitary equipment 1. Moreover, it should be noted that, the second position is a certain position of the cover plate 20 between a position of the cover body 20 completely opening the opening of the main body 10 and a position of the cover body 20 completely closing the opening, which may be adjusted by the user according to an actual requirement.

In order to fully convey the spirit of the disclosure, a plurality of embodiments is provided below to describe different application situations of the sanitary equipment 1 in detail.

Figure 3A:
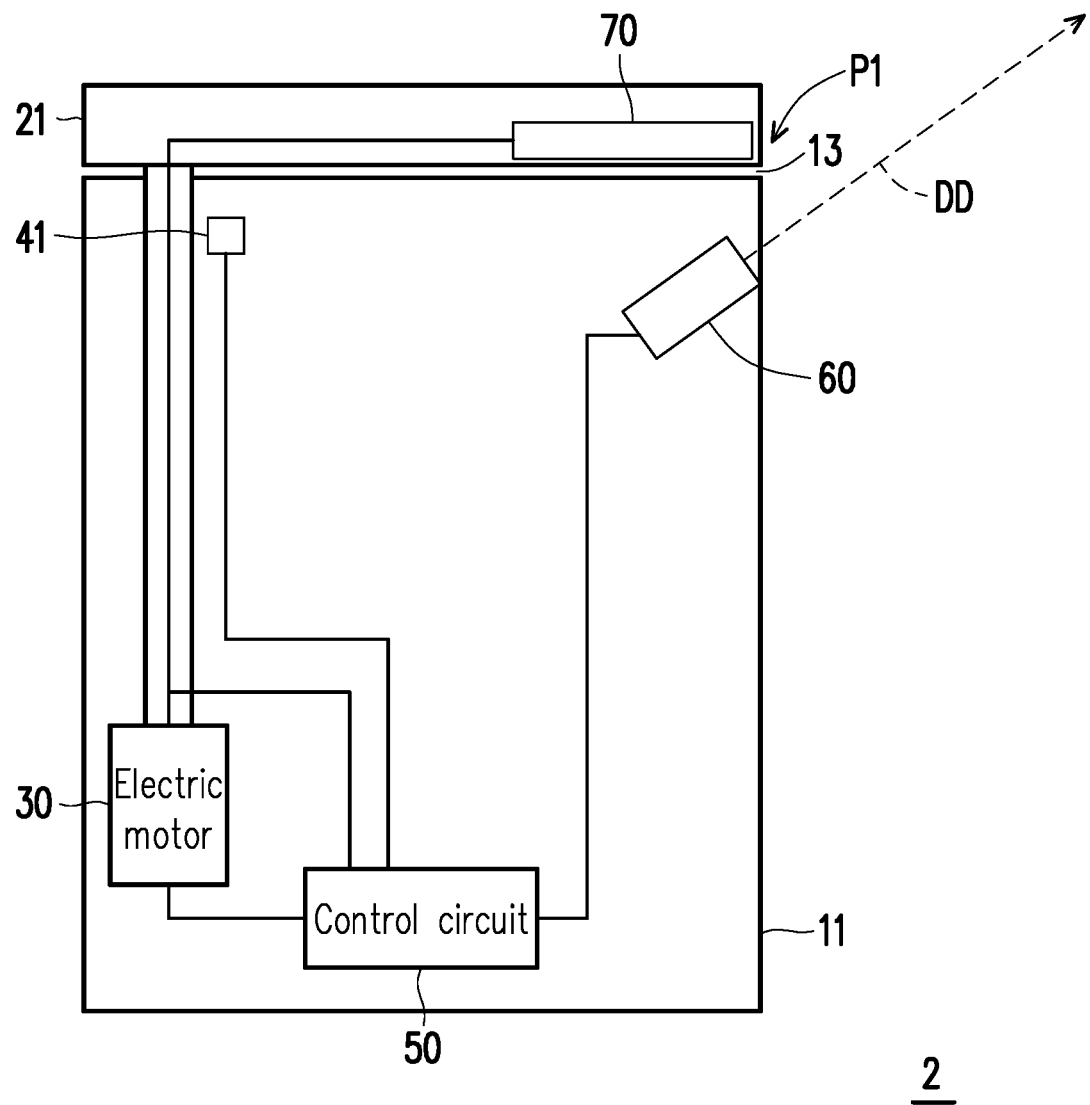
FIGS. 3A and 3B are schematic diagrams of a toilet according to a first embodiment of the disclosure.
Figure 3B:
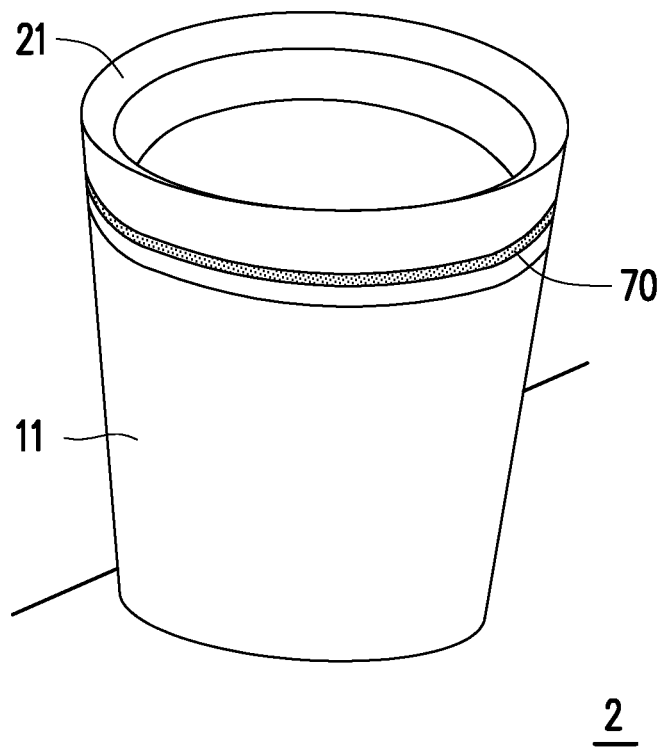

It is assumed that the sanitary equipment 1 is a toilet. FIGS. 3A and 3B are schematic diagrams of a toilet 2 according to a first embodiment of the disclosure. Referring to FIG. 3A and FIG. 3B, the main body 10 of the toilet 2 includes a base body 11, and the top of the base body 11 is configured with a cover body (i.e. a toilet lid 21) adapted to move horizontally, so as to shield an opening 13 of the main body 10 (as shown in FIG. 3B). The cover body is a horizontal open-close cover body, and the horizontal open-close cover body may be a rotary cover body or a sliding cover body. There is an additional accommodating space above the toilet lid 21 for placing items or planting plants. The auxiliary device 40 of the toilet 2 is a loudspeaker 41. Moreover, the toilet 2 further includes a wireless communication receiver 60 and an illumination device 70 connected to the control circuit 50.

The wireless communication receiver 60 may be a receiver supporting wireless communication techniques such as Bluetooth, infrared ray, ZigBee, etc. In the embodiment, the wireless communication receiver 60 receives a wireless command signal sent by a smart phone, a table PC, a remote controller of the user. It should be noted that, a receiving direction DD of the wireless communication receiver 60 is not limited to the direction shown in the figure, and the base body 11 is made of a non-shielding material. The illumination device 70 may be a light bulb of various types such as an LED stripe, a fluorescent lamp, a halogen lamp, etc., or other illuminants in a special shape. As shown in FIG. 3B, the illumination device 70 may be exposed, or the light thereof is emitted out through the opening 13. In the embodiment, when the toilet lid 21 is closed, the control circuit 50 controls the illumination device 70 to emit light, so as to prompt the user where the toilet 2 is located.

Figure 4:
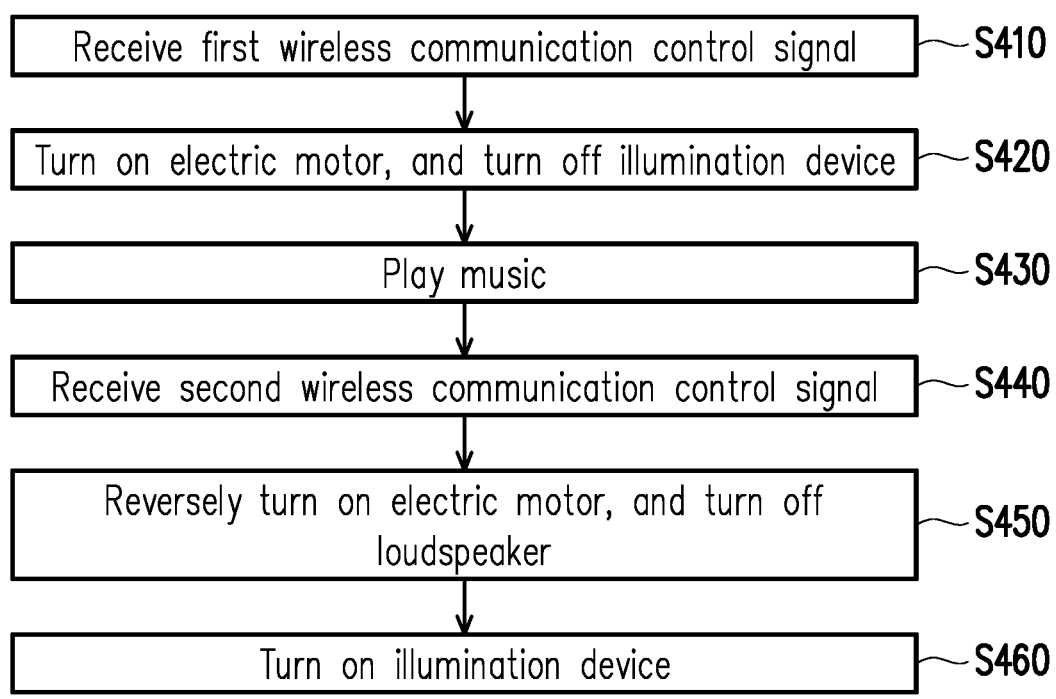
FIG. 4 is a flowchart illustrating a control method of the toilet according to the first embodiment of the disclosure.
Figure 5A:
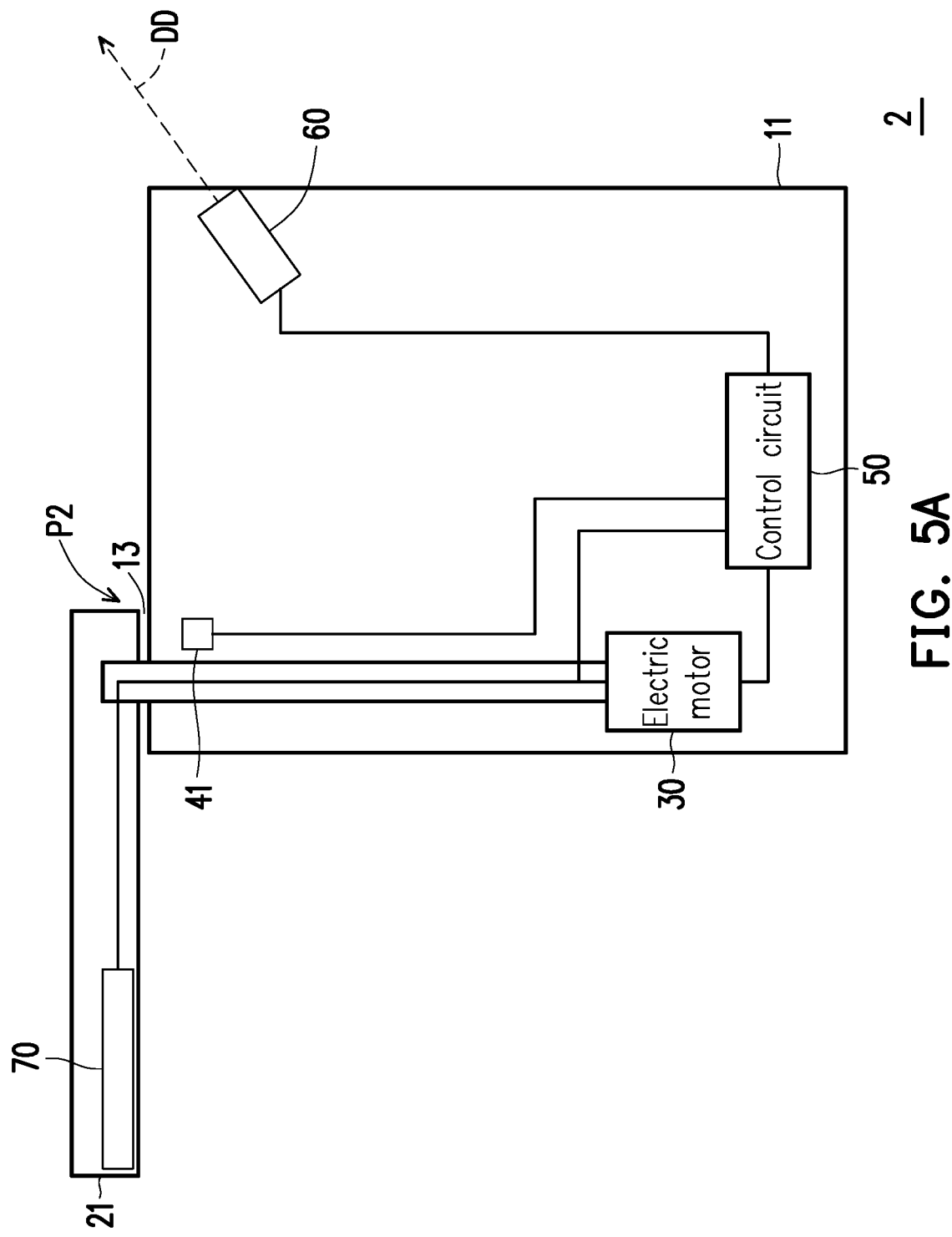
FIGS. 5A and 5B are schematic diagrams of the toilet according to the first embodiment of the disclosure.
Figure 5B:
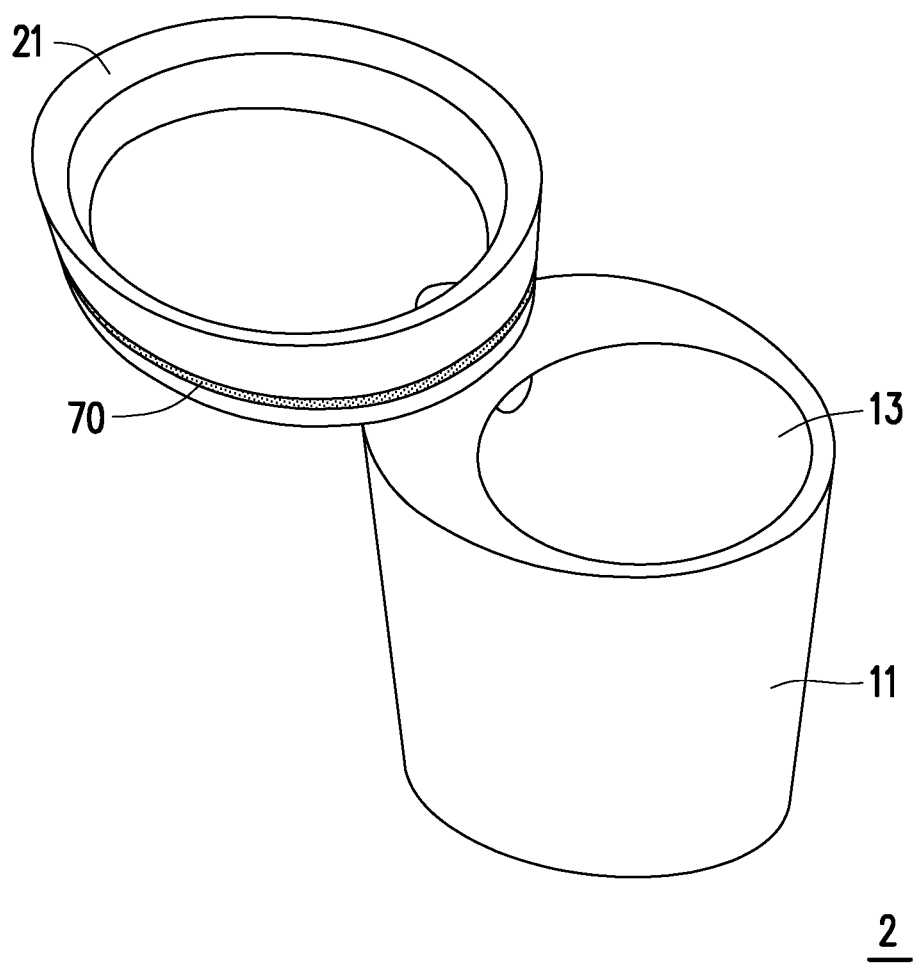

FIG. 4 is a flowchart illustrating a control method of the toilet 2 according to the first embodiment of the disclosure. Referring to FIG. 4, a remote controller or a mobile phone, for example, sends a first wireless command signal by using a Bluetooth communication technique. After the wireless communication receiver 60 receives the first wireless command signal, the wireless communication receiver 60 generates a detection signal to the control circuit 50 according to the first wireless command signal (step S410). The control circuit 50 generates a control signal according to the detection signal, to instruct to turn on the electric motor 30 according to the control signal. Then, the electric motor 30 drives the toilet lid 21 to rotate horizontally for opening (i.e. the rotary cover body), such that the opening 13 is opened (as shown in FIG. 5A and FIG. 5B, one end of the toilet lid 21 moves toward a position P2 shown in FIG. 5A). The rotary opening may prevent the items or plants on the toilet lid 21 from dumping or falling. Moreover, the control circuit 50 turns off the illumination device 70 (step S420).

After the control circuit 50 receives the detection signal, a certain number of seconds (for example, 1, 2 seconds, etc.) is waited and the toilet lid 21 is opened to a certain extent (as shown in FIG. 5A, a right end of the toilet lid 21 to the position P2). Then, the control circuit 50 controls the loudspeaker 41 to continuously play a sound effect/music (step S430). Accordingly, the sound effect/music can cover the sound of toilet use by the sound effect/music. The aforementioned steps S420-S430 corresponds to the first process.

After toilet use is completed, the user may send a second wireless command signal by using the remote controller or the mobile phone, and the wireless communication receiver 60 generates a detection signal according to the second wireless command signal (step S440). FIGS. 5A and 5B are schematic diagrams of the toilet 2 according to the first embodiment of the disclosure. The control circuit 50 generates a control signal according to the detection signal, to instruct to turn on the electric motor 30 according to the control signal. Then, the electric motor 30 reversely drives the toilet lid 21 to rotate horizontally for closing and meanwhile turns off the loudspeaker 41, such that the opening 13 is closed (as shown in FIGS. 3A and 3B, one end of the toilet lid 21 moves toward the position P1 shown in FIG. 3A) (step S450). The step S450 corresponds to the second process.

Moreover, the control circuit 50 turns on the illumination device 70 (step S460). In this way, the toilet 2 may be disguised as a decoration in home when not in use. Through the wireless remote end control, the user may perform initial setting on the control circuit 50 of the toilet 2 before entering the toilet or the bathroom, so as to avoid urgent use of the toilet 2. Moreover, lid closing and water flushing operations may be performed through the wireless remote control after the user leaves the toilet or the bathroom, such that the user may move away from the toilet as quickly as possible, thereby effectively avoiding excessive inhalation of stink or bacteria by user.

Figure 6A:
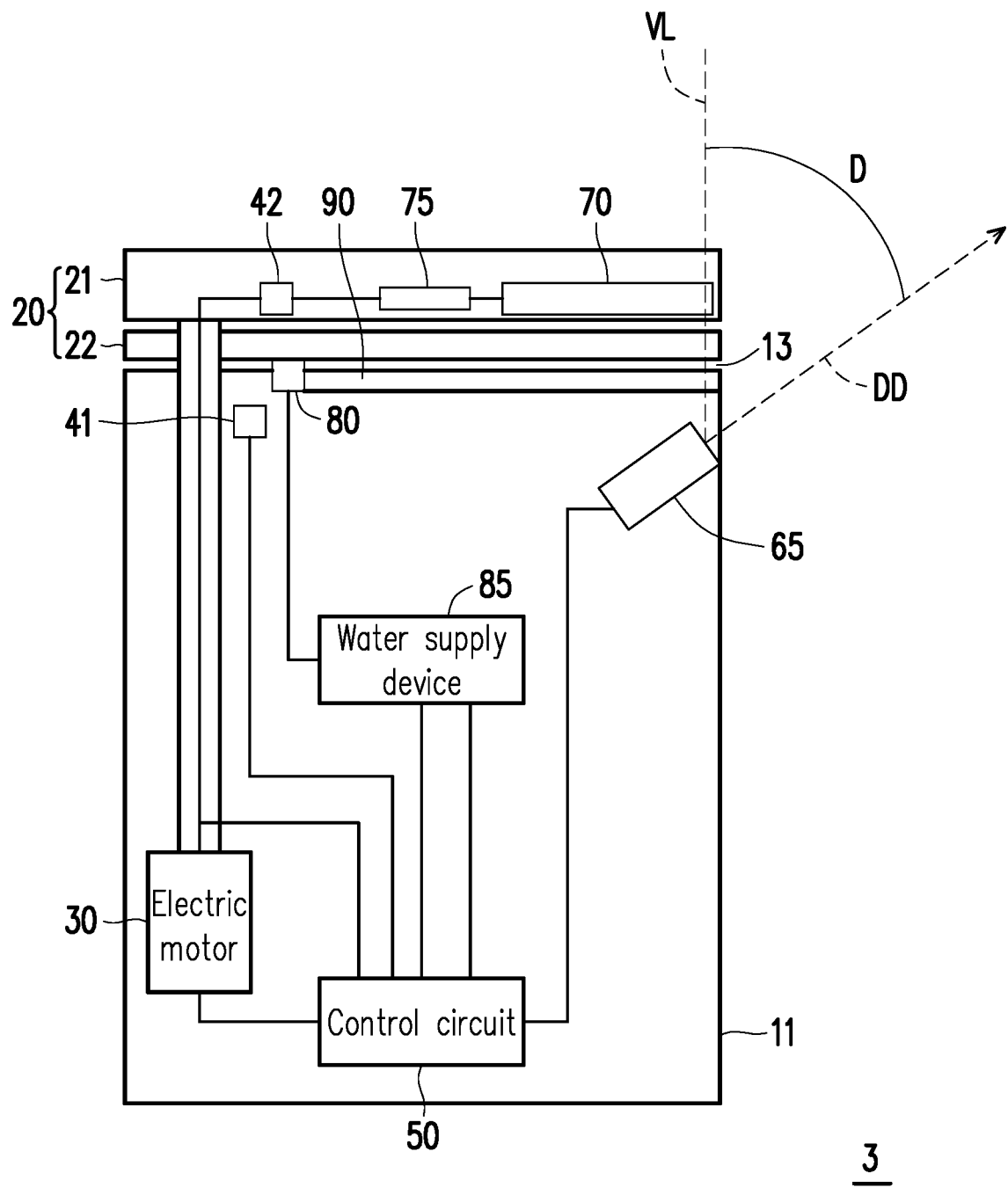
FIGS. 6A and 6B are schematic diagrams of a toilet according to a second embodiment of the disclosure.
Figure 6B:
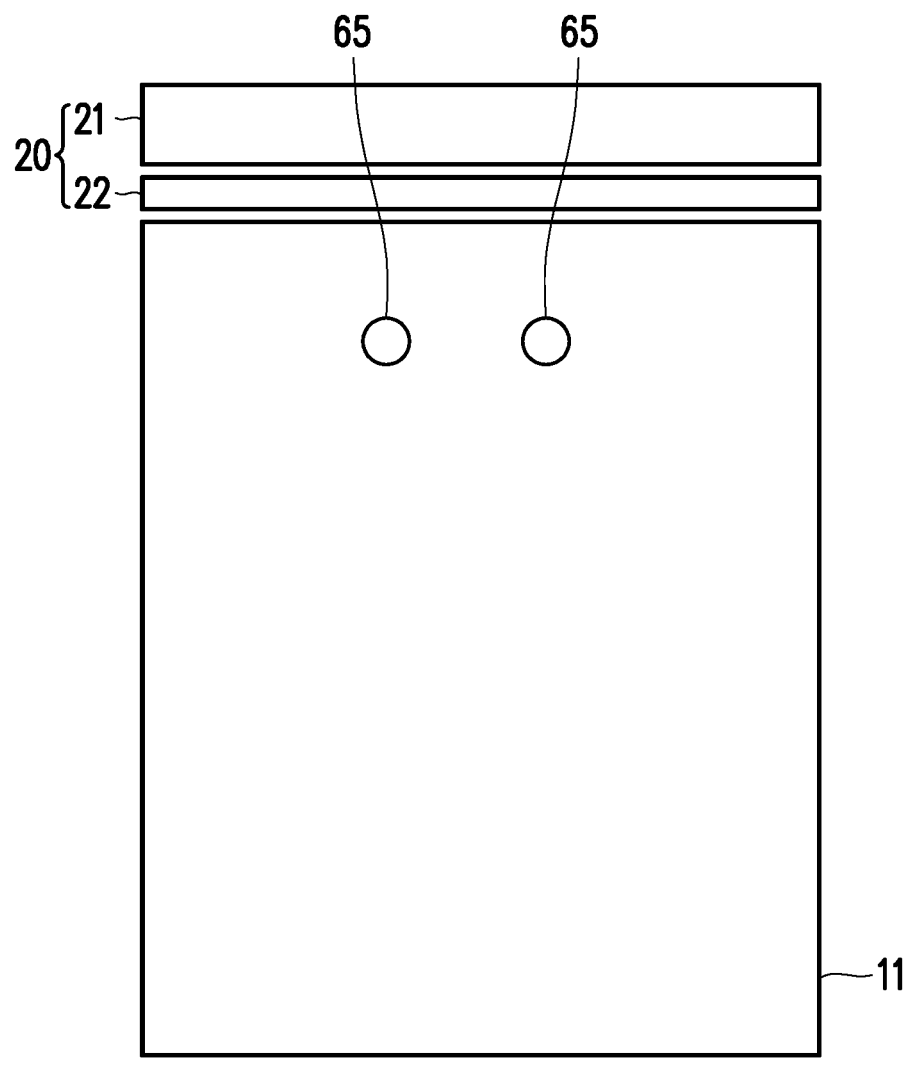

FIGS. 6A and 6B are schematic diagrams of a toilet 3 according to the second embodiment of the disclosure. Referring to FIG. 6B, the differences between the toilet 3 and the toilet 2 of the first embodiment are the following. The cover body 20 of the toilet 3 further includes a toilet seat 22. The auxiliary device 40 further includes a fragrance dispenser 42 and a motion sensor 65 replaced from the wireless communication receiver 60. The toilet 3 further includes a disinfection device 75, a cover body detection element 80, a water supply device 85 and a pressure sensor 90.

The motion sensor 65 may be an interception type motion sensor (for example, an infrared (IR) sensor, an ultrasonic sensor, etc.), an image sensor, a touch sensor, or other sensors adapted to generate a pressure sensing value/data in response to motion/action of an external object or body.

It should be noted that, the motion sensor 65 is disposed in the base body 11 and is coupled to the control circuit 50, and a range of an included angle D between the detection direction DD of the motion sensor 65 and a ground vertical line VL is 10-80 degrees. Referring to FIG. 6B, the toilet 3 of the embodiment is configured with two motion sensors 65, so as to increase a sensing range to accordingly derive a motion/action that the object is moved from one motion sensor 65 to the other motion sensor 65. A sensing value/information (i.e. the detection signal) of the motion sensor 65 is transmitted to the control circuit 50, and the control circuit 50 analyses control information (for example, to open the toilet seat 22, to open both of the toilet lid 21 and the toilet seat 22, etc.) represented by the detection signal, and details thereof are described later.

The disinfection device 75 is disposed in the toilet lid 21, and is coupled to the control circuit 50 and controlled by the control circuit 50, and is adapted to provide ultraviolet (UV) light or spray disinfectant and antibacterial agent to the toilet seat 22. For example, the disinfection device 75 is an UV disinfection lamp, and the UV disinfection lamp is configured to provide UV light to irradiate the toilet seat 22. It should be noted that, in some embodiments, the illumination device 70 is the UV disinfection lamp.

The cover body detection element 80 may be a mechanical switch such as a micro switch, a tact switch, a toggle switch, etc., or an infrared receiver, a proximity sensor, etc. In the embodiment, the cover body detection element 80 is configured to detect movement of the cover body 20. When a certain part of the cover body 20 is moved to a specific position to trigger a mechanical component of the cover body detection element 80 or is sensed by the cover body detection element 80, the cover body detection element 80 generates a cover body opening signal and a cover body closing signal. For example, when the cover body 20 is completely closed as shown in FIG. 6A, the cover body detection element 80 sends the cover body closing signal. Moreover, after detecting a movement of the cover body 20, the cover body detection element 80 may also generate a cover body moving signal to the control circuit 50. It should be noted that, the aforementioned specific position may be changed according to an actual requirement, which is not limited by the disclosure.

The water supply device 85 is coupled to the control circuit 50, and is used for supplying water to an inner space of the base body 11.

The pressure sensor 90 may be a piezoelectric, a capacitive, a resistive, or other sensors adapted to produce a pressure sensing value/data in response to an external force, and the pressure sensor 90 is coupled to the control circuit 50. In the embodiment, the pressure sensor 90 is designed to detect an external force on the cover body 20, so as determine whether an object is located on the cover body 20.

Figure 7:
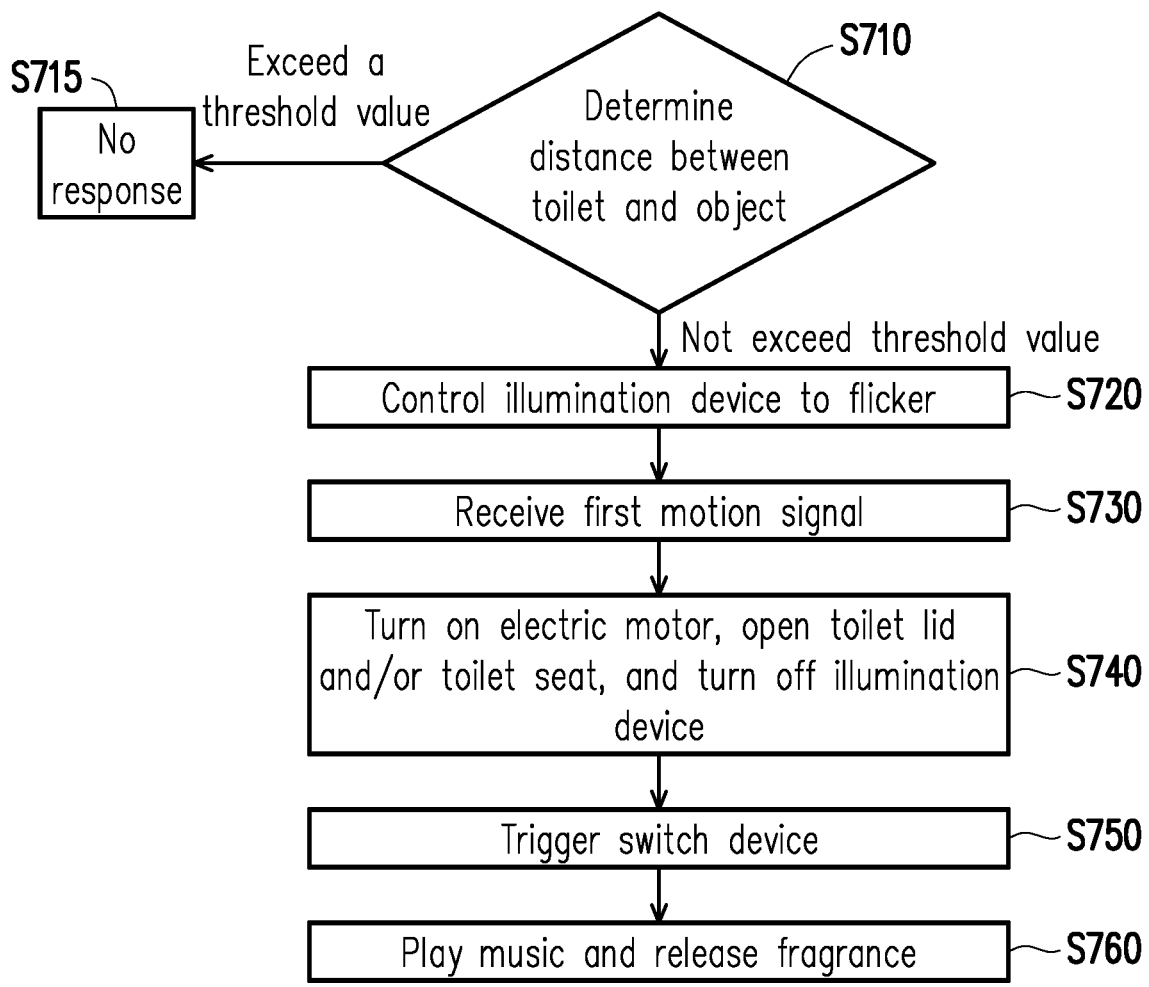
FIG. 7 is a flowchart illustrating a control method of a toilet according to the second embodiment of the disclosure.

FIG. 7 is a flowchart illustrating a control method of the toilet 3 according to the second embodiment of the disclosure. Referring to FIG. 7, the control circuit 50 controls the motion sensor 65 to determine a distance between the toilet 3 and the object according to a threshold value (step S710). If the distance between the object and the toilet 3 exceeds the threshold value, the illumination device 70 has no response (i.e. remains closed or does not emit light) (step S715). If the distance between the object and the toilet 3 does not exceed the threshold value, the control circuit 50 controls the illumination device 70 to remain in light or flicker (step S720).

Figure 8B:
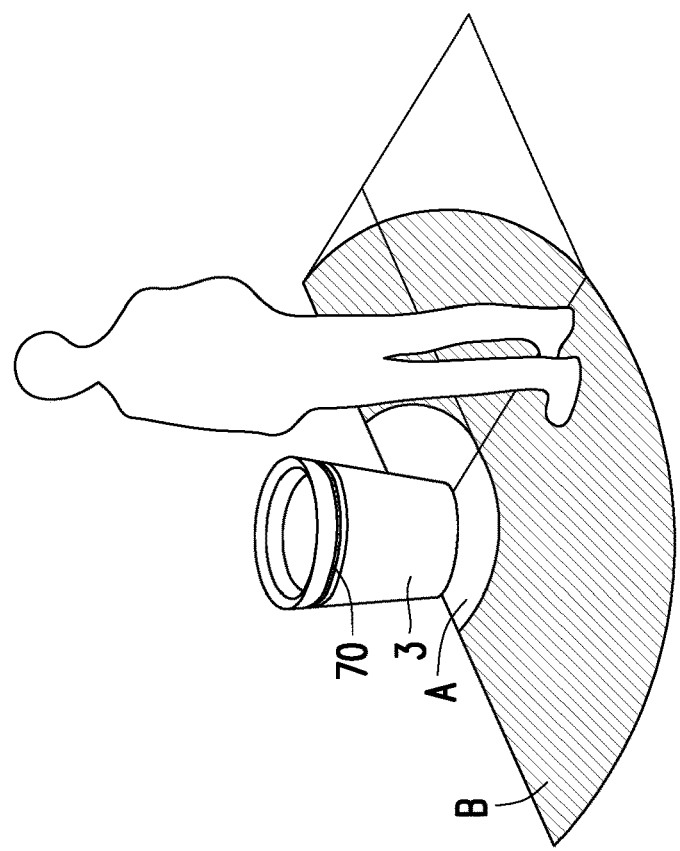
FIGS. 8A to 8H are schematic diagrams of operating a toilet according to the second embodiment of the disclosure.
Figure 8A:
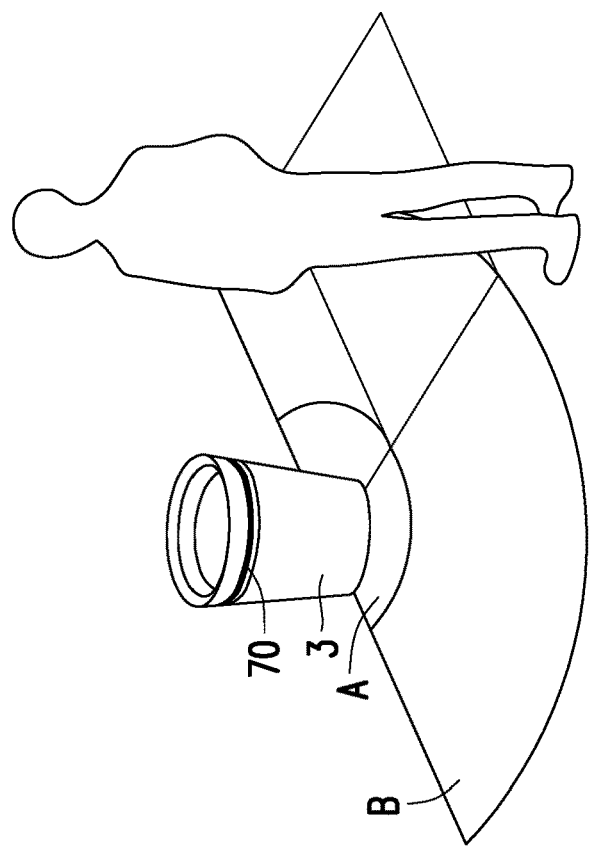

For example, FIGS. 8A to 8H are schematic diagrams of operating the toilet 3 according to the second embodiment of the disclosure. Referring to FIGS. 8A and 8B, the control circuit 50 sets a range A within 30 cm from the toilet 3, and a range B within 100 cm from the toilet 3. When the motion sensor 65 senses that there is no object within 100 cm from the toilet 3, the control circuit 50 turns off the illumination device 70 (as shown in FIG. 8A). When the user moves to the range B, the motion sensor 65 senses an object within 30 to 100 cm from the toilet 3, and the control circuit 50 controls the illumination device 70 to flicker (as shown in FIG. 8B).

When the object is located within the range B, the motion sensor 65 detects a movement of the object within the range A (for example, hand waving, body moving, head shaking etc.). The control circuit 50 receives a first motion/detection signal generated by the motion sensor 65 in response to the motion of the object (step S730), and accordingly turns on the electric motor 30 and turns off the illumination device 70, such that the toilet lid 21 and/or the toilet seat 22 are opened (step S740). It should be noted that, according to different motions, the control circuit 50 may drive the electric motor 30 in different manners (for example, forward driving, reverse driving, or driving the toilet lid 21 and/or the toilet seat 22, etc.).

Figure 8D:
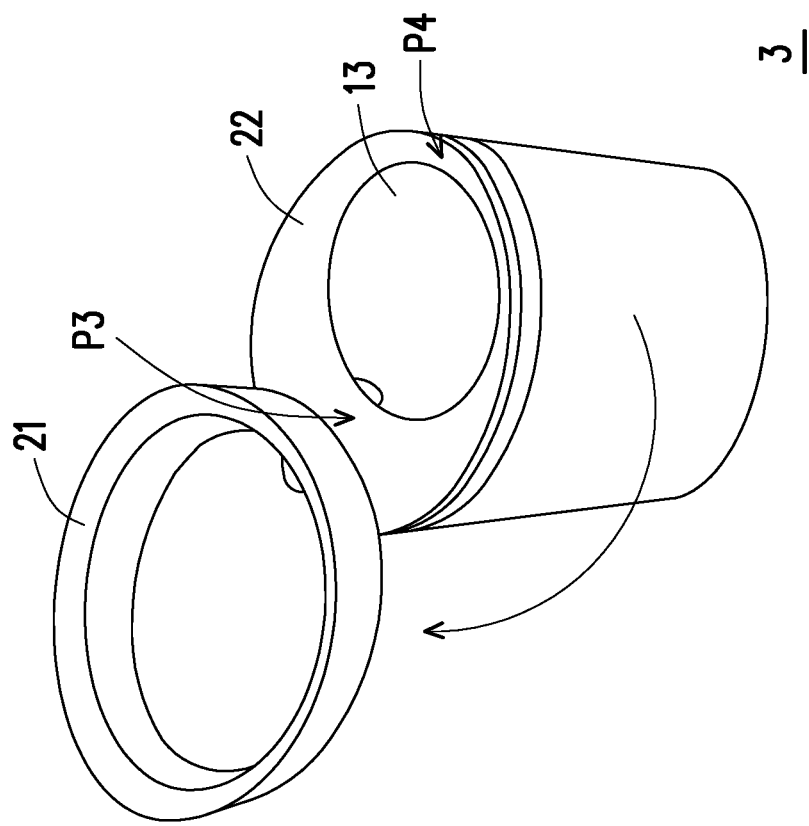
Figure 8C:
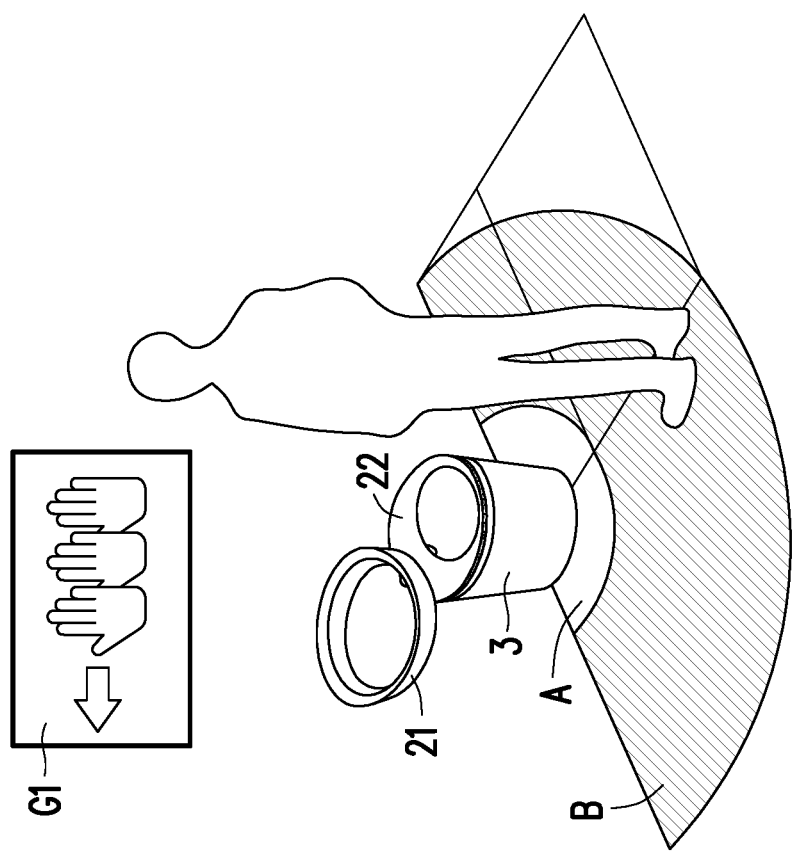

For example, referring to FIGS. 8C and 8D, when the motion sensor 65 detects that a gesture G1 of the user is to wave from right to left, the control circuit 50 controls the electric motor 30 to horizontally rotate and open the toilet lid 21 in an arrow direction shown in FIG. 8D according to a single-gesture or single-finger gesture waving signal (i.e. the detection signal) generated by the motion sensor 65 in response to the gesture G1 of a single waving operation, though the toilet seat 22 is maintained in an original position (i.e. the toilet seat 22 is maintained stationary). The user may sit on the toilet seat 22.

Figure 8F:
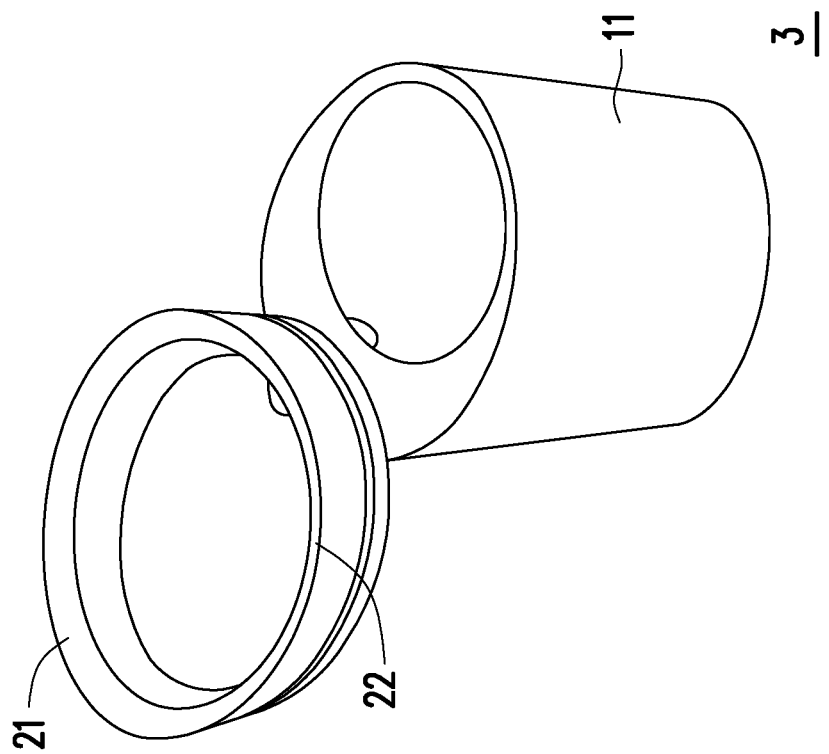
Figure 8E:
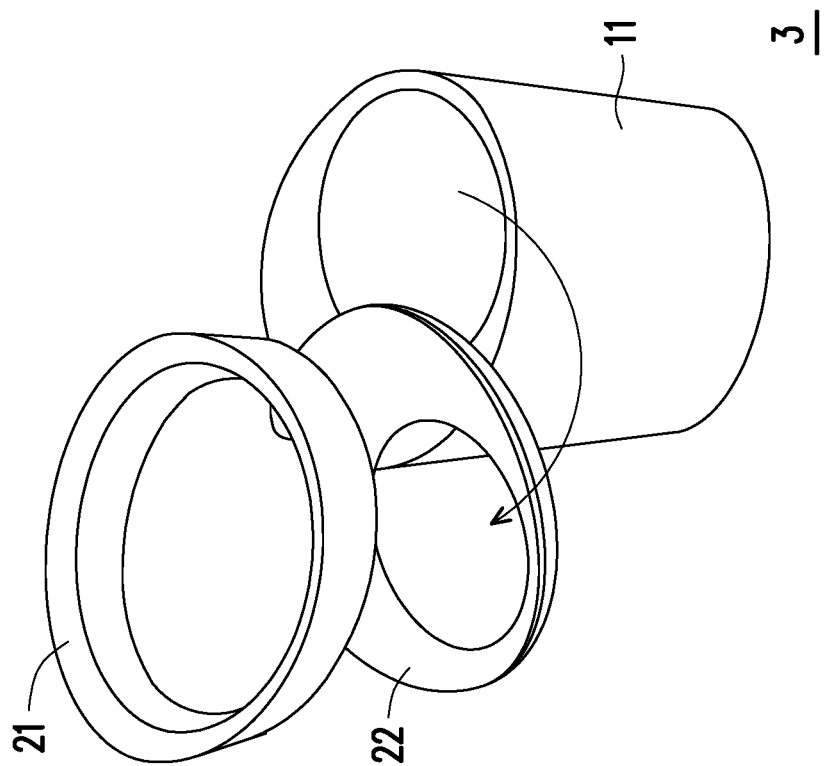

Referring to FIGS. 8E and 8F, during the process of opening or rotating the toilet lid 21, and the motion sensor 65 detects the gesture G1 of the user waving from right to left again, and the control circuit 50 controls the electric motor 30 to horizontally rotate and open the toilet seat 22 in an arrow direction shown in FIG. 8E (i.e. to move toward a position P3 shown in FIG. 8D) according to a multi-gesture or multi-finger gesture waving signal (i.e. the detection signal) generated by the motion sensor 65 in response to the gesture G1 of a second waving operation. It should be noted that, the control circuit 50 may also simultaneously open the toilet lid 21 and the toilet seat 22 in response to a gesture of a back and forth waving operation (i.e. the multi-gesture or multi-finger gesture waving signal). Moreover, in some embodiments, the electric motor 30 may also horizontally rotate and open the base body 11, and the toilet lid 21 and/or the toilet seat 22 remain stationary, so as to open the opening 13. Alternatively, referring to FIG. 8G, the electric motor 30 horizontally pushes the toilet lid 21 and the toilet seat 22 backward in an arrow direction shown in FIG. 8G (i.e. the sliding cover body). It should be noted that, according to different gestures, different ways of opening the cover body 20 are correspondingly generated. There are many ways for opening the cover body 20, and the user may change the design according to an actual requirement, which is not limited by the disclosure.

Figure 8H:
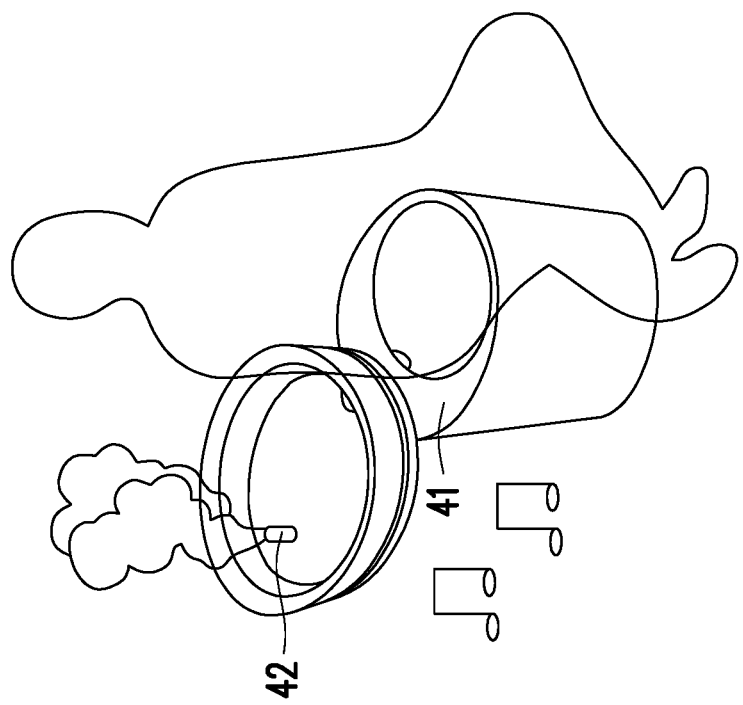
Figure 8G:
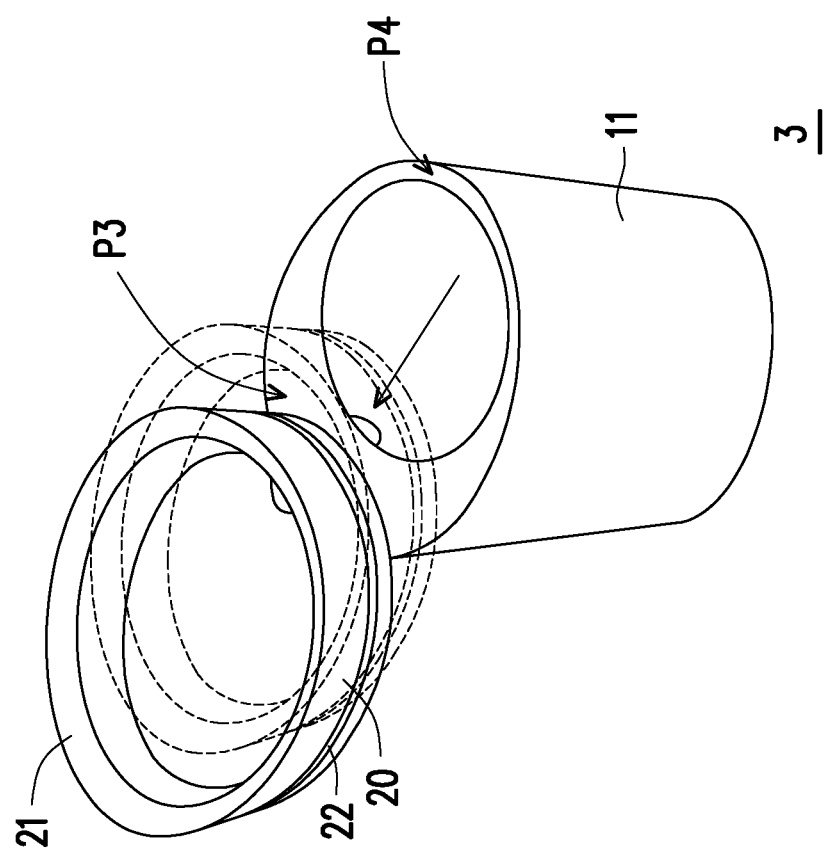

On the other hand, the cover body detection element 80 is triggered as the cover body 20 (the toilet lid 21 and/or the toilet seat 22) is moved to a specific position (the position P3 shown in FIG. 8D) (step S750) (i.e. the cover body detection element 80 detects that the movement of the cover body 20 is to open the opening 13, so as to generate a cover body opening signal to the control circuit 50, and the control circuit 50 may turn on the auxiliary device 40 according to the cover body opening signal. Namely, the embodiment of the disclosure uses the cover body detection element 80 to detect whether the cover body 20 is opened. After the cover body 20 is opened or opened to the specific position, the control circuit 50 turns on the auxiliary device 40 to continuously play music or sound and spray the aromatic or deodorant in a single or intermittent manner (step S760) (as shown in FIG. 8H), so as to enhance the atmosphere of using the toilet. The steps S740-S760 correspond to the first process.

It should be noted that, the fragrance dispenser 42 may be an oily fragrance dispenser. The oily fragrance dispenser is configured to spray and form an oily aromatic film on a water surface inside the main body 10, and the oily aromatic film may serve as a protection to prevent stink in water, and further deliver a fresh fragrance of essential oils.

Figure 9:
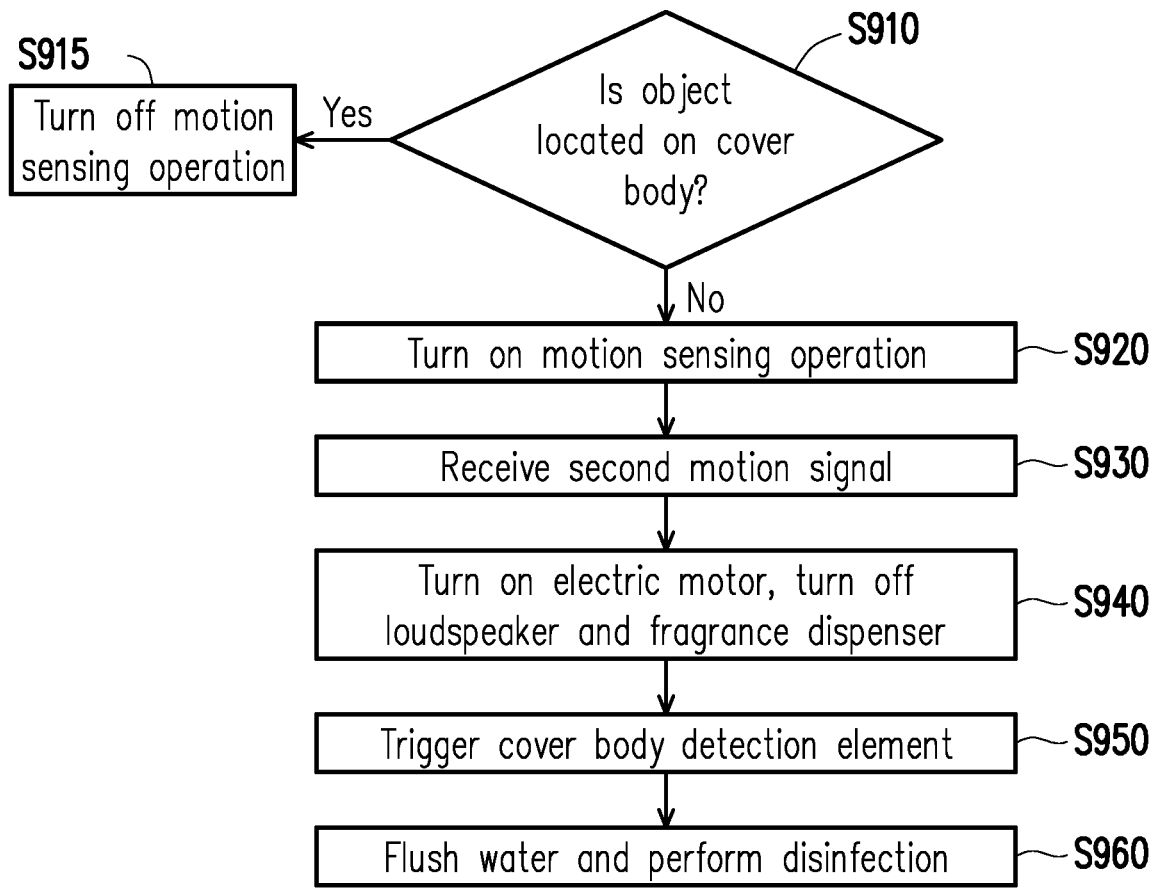
FIG. 9 is a flowchart illustrating a control method of the toilet according to the second embodiment of the disclosure.

FIG. 9 is a flowchart illustrating a control method of the toilet 3 according to the second embodiment of the disclosure. Referring to FIG. 9, in order to prevent the toilet lid 21 from being driven during the process that the user uses the toilet, the control circuit 50 determines whether an object is located on the cover body 20 (for example, the toilet seat 22) through a pressure sensing value of the pressure sensor 90 (step S910). If the object is located on the cover body 20, the control circuit 40 stops or turns off the motion sensing operation of the motion sensor 65 to the external object (step S915), such that the control circuit 50 does not open the cover body 20. In this way, usage of the toilet 3 with safety is improved.

On the other hand, if the user leaves the toilet seat 22, and the pressure sensor 90 does not sense other external force, the control circuit 50 turns on the motion sensing operation of the motion sensor 65 (step S920), so as to sense motion of the external object.

If the control circuit 50 receives a second operation/detection signal (step S930) generated by the motion sensor 65 in response to motion of object (step S930). The control circuit 50 may generate another control signal to control the electric motor 30 to reversely drive the cover body 20 to rotate horizontally for closing (if the toilet lid 21 and the toilet seat 22 are opened at the same time or one-by-one, they are then closed at the same time or one-by-one) (i.e. to move toward a position P4 shown in FIG. 10B), and meanwhile turn off the loudspeaker 41 and the fragrance dispenser 42, or only turn off the loudspeaker 41 (step S940). The step S940 corresponds to the second process. Since the toilet lid 21 and the toilet seat 22 may be closed at the same time or one-by-one, the user is unnecessary to perform two operations.

Figures 10A, 10B:
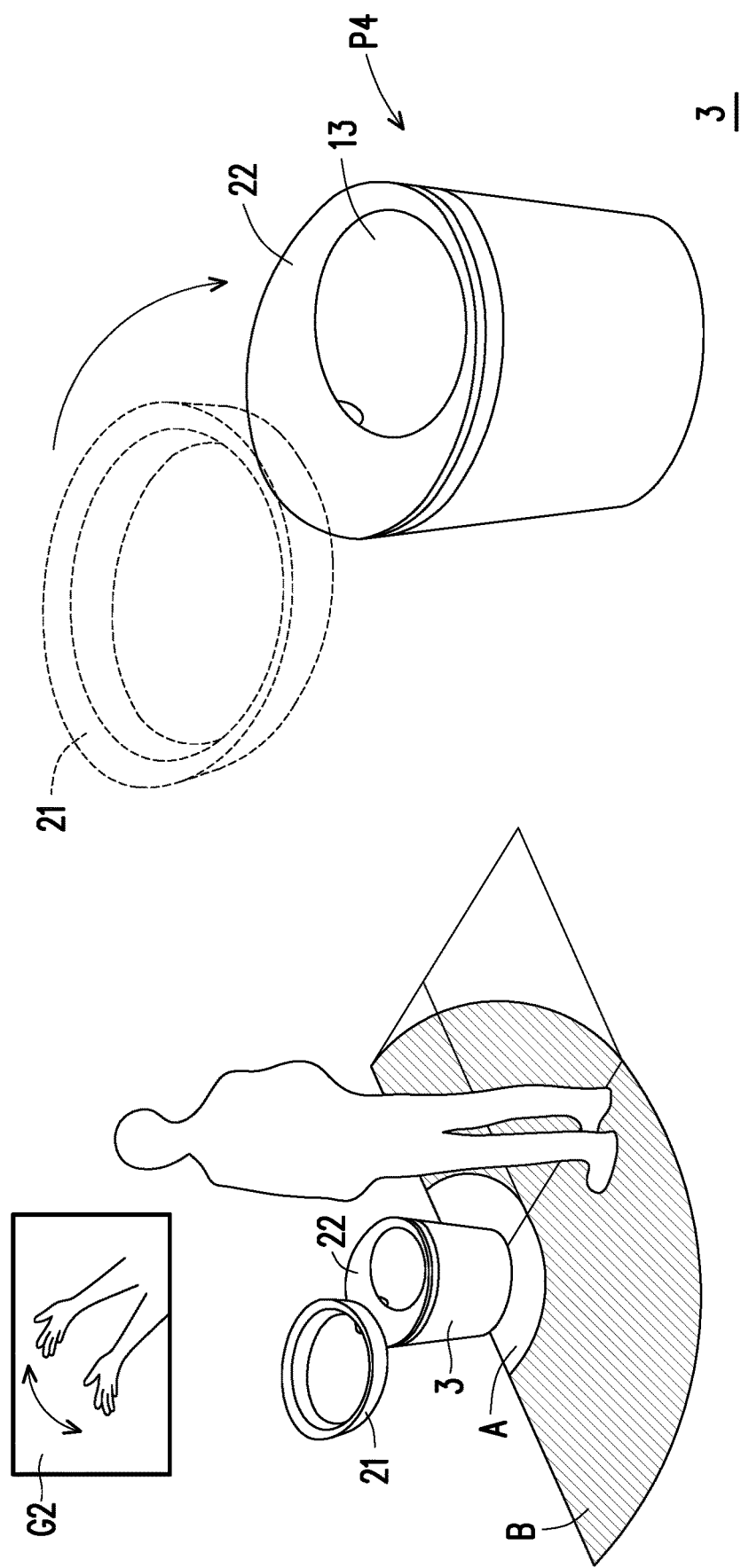
FIGS. 10A and 10B are schematic diagrams of operating the toilet according to the second embodiment of the disclosure.

For example, FIGS. 10A and 10B are schematic diagrams of operating the toilet 3 according to the second embodiment of the disclosure. Referring to FIGS. 10A and 10B, when the motion sensor 65 detects that a gesture G2 of the user is to wave from left to right, the control circuit 50 controls the electric motor 30 to horizontally rotate and close the toilet lid 21 in an arrow direction shown in FIG. 10B, or close the toilet lid 21 and the toilet seat 22 at the same time or one-by-one according to a single-gesture waving signal generated by the motion sensor 65 in response to the gesture G2 waving from left to right. In other embodiments, the gesture G2 may be a single-finger gesture waving, a multi-gesture waving or multi-finger gesture waving. Preferably, according to different opening situations of the cover body 20, the user may close the toilet lid 21 or close the toilet lid 21 and the toilet seat 22 regardless of the gesture that the user uses, and it is unnecessary to record excessive gestures.

It should be noted that, if the fragrance dispenser 42 adopts a continuous spraying manner or an intermittent spraying manner in the first process, in the second process, the fragrance dispenser 42 and the loudspeaker 41 are required to be closed at the same time or one-by-one. Considering continuous spraying may waste resources, in a preferred embodiment of the disclosure, after the fragrance dispenser 42 sprays in the single or intermittent manner in the first process, the fragrance dispenser 42 is first turned off. Then, in the second process, the fragrance dispenser 42 is unnecessary to spray or again sprays in the single manner, and is unnecessary to be turned off.

Moreover, when the toilet lid 21 and the toilet seat 22 are completely closed or moved to the specific position (the position P4 shown in FIG. 8D), the cover body detection element 80 is triggered to generate a cover body closing signal to the control circuit 50 (step S950) (i.e. the cover body detection element 80 detects that the movement of the cover body 20 is to close the opening 13). The control circuit 50 confirms that the toilet lid 21 is closed to the opening 13, and then turns on the water supply device 85 according to the cover body closing signal, so as to flush water in the inner space of the base body 11. After a predetermined time (for example, 5 seconds, 10 seconds, etc.), the water supply device 85 stops supplying water. During the process that the water supply device 85 flushes water, the toilet lid 21 is closed, so as to avoid stink and bacteria spilling with water flush.

It should be noted that, the control circuit 50 may record a prior opening situation of the cover body 20 (for example, the toilet lid 21 and the toilet seat 22 are simultaneously opened or opened one-by-one, or only the toilet lid 21 is opened alone), and the control circuit 50 controls the water supply device 85 to provide water of different amounts to the base body 11. The water supply device 85 may include a urine flushing device and a fecal flushing device. A male user opening the toilet lid 21 and the toilet seat 22 at the same time or one-by-one is supposed to pee, so that the urine flushing device is turned on after it is confirmed that the toilet lid 21 is closed to the opening 13. Accordingly, the urine flushing device flushes water in the main body 10 of the toilet 3 by using a first water amount. Regarding the situation that only the toilet lid 21 is opened, the fecal flushing device is turned on after it is confirmed that the opening 13 is closed by the toilet lid 21. Accordingly, the fecal flushing device flushes water in the main body 10 of the toilet 3 by using a second water amount greater than the first water amount. In this way, for the situations of simultaneous opening or one-by-one opening, water amount of the used water is saved.

In order to improve sanitation and cleanliness, when it is determined that the water supply device 85 is turned on or water supplying is ended, the control circuit 50 confirms that the opening 13 is closed by the toilet lid 21, and the disinfection device 75 faces the toilet seat 22, the control circuit 50 then turns on the disinfection device 75 to perform a disinfection operation (for example, to irradiate the UV light or spray antibacterial agent, etc.) (step S960).

Toilet designs based on the spirit of the disclosure are plural, and in order to reduce an environmental space occupied by the toilet, the disclosure further provides a toilet design of a third embodiment. FIGS. 11A to 11F are schematic diagrams of operating the toilet 3 according to a third embodiment of the disclosure. Referring to FIG. 11A, the toilet lid 21 of the toilet 3 is replaced by an outer cover 23 (i.e. the cover body 20), so as to shield the opening 13 and the base body 11 of the whole toilet 3. The motion sensor 65 is required to be disposed in a wall W to facilitate detecting an external object.

Referring to FIGS. 11A and 11B, when the motion sensor 65 detects that a gesture G3 of the user is to wave from left to right, the control circuit 50 controls the outer cover 23 to open and control the electric motor 30 to horizontally move the toilet 3 to a position shown in FIG. 11B in an arrow direction shown in FIG. 11B according to a motion signal generated by the motion sensor 65 in response to the gesture G3 waving to the right. Now, the opening 13 is opened, and no toilet seat 22 is located at the top side of the base body 11.

Referring to FIGS. 11C and 11D, when the motion sensor 65 detects that a gesture G4 of the user is to wave from right to left, the control circuit 50 controls the outer cover 23 to open and control the electric motor 30 to horizontally move the toilet 3 to a position shown in FIG. 11D in an arrow direction shown in FIG. 11D according to a single-gesture waving signal generated by the motion sensor 65 in response to the gesture G4 waving to the left. Now, the opening 13 is opened, and the toilet seat 22 is located on the top side of the base body 11.

Referring to FIGS. 11E and 11F, when the motion sensor 65 detects that a gesture G5 of the user is to wave from left to right, the control circuit 50 controls the electric motor 30 to horizontally move the toilet 3 to a position shown in FIG. 11F in an arrow direction shown in FIG. 11E according to a single-gesture waving signal generated by the motion sensor 65 in response to the gesture G5 waving to the right, and closes the outer cover 23. Now, the base body 11 of the toilet 3 is shielded by the wall W and the outer cover 23. Moreover, after the toilet 3 is closed to a fixed position, the cover body detection element 80 is triggered, and the control circuit 50 turns on the water supply device 85 for a predetermined time (for example, 4 seconds, 7 seconds, etc.) before being turned off.

Figure 12:
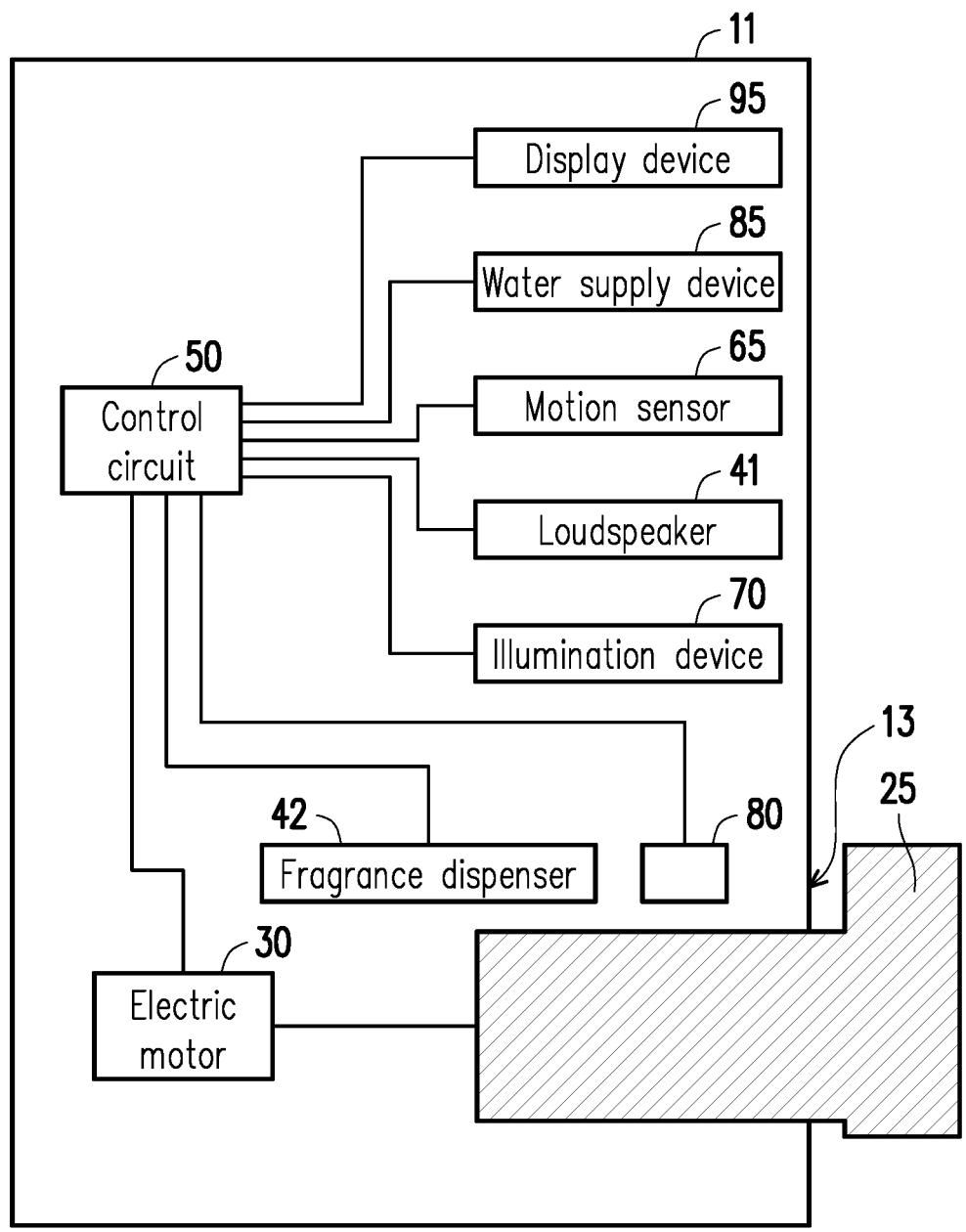
FIG. 12 is a schematic diagram of a water sink according to a fourth embodiment of the disclosure.

Besides the toilet, the sanitary equipment 1 may also be a water sink. FIG. 12 is a schematic diagram of a water sink 4 according to a fourth embodiment of the disclosure. Referring to FIG. 12, different to the aforementioned embodiments, the cover body 20 of the water sink 4 is an outer cover 25, which is used for shielding the opening 13. The water sink 4 further includes a display device 95 (for example, an LCD, an LED screen, etc.).

It should be noted that, the display device 95 may be a general display device, or a touch display device. If the display device 95 is the general display device, it may be used in collaboration with the motion sensor 65 to prevent the user's finger from touching a surface of a display panel, so as to avoid polluting the surface of the display panel. If the display device 95 is the touch display device, it is unnecessary to dispose with the motion sensor 65, the water sink 4 requires a less number of components, and the user may directly select operations for controlling the water sink 4 in the touch display device.

Figure 13:
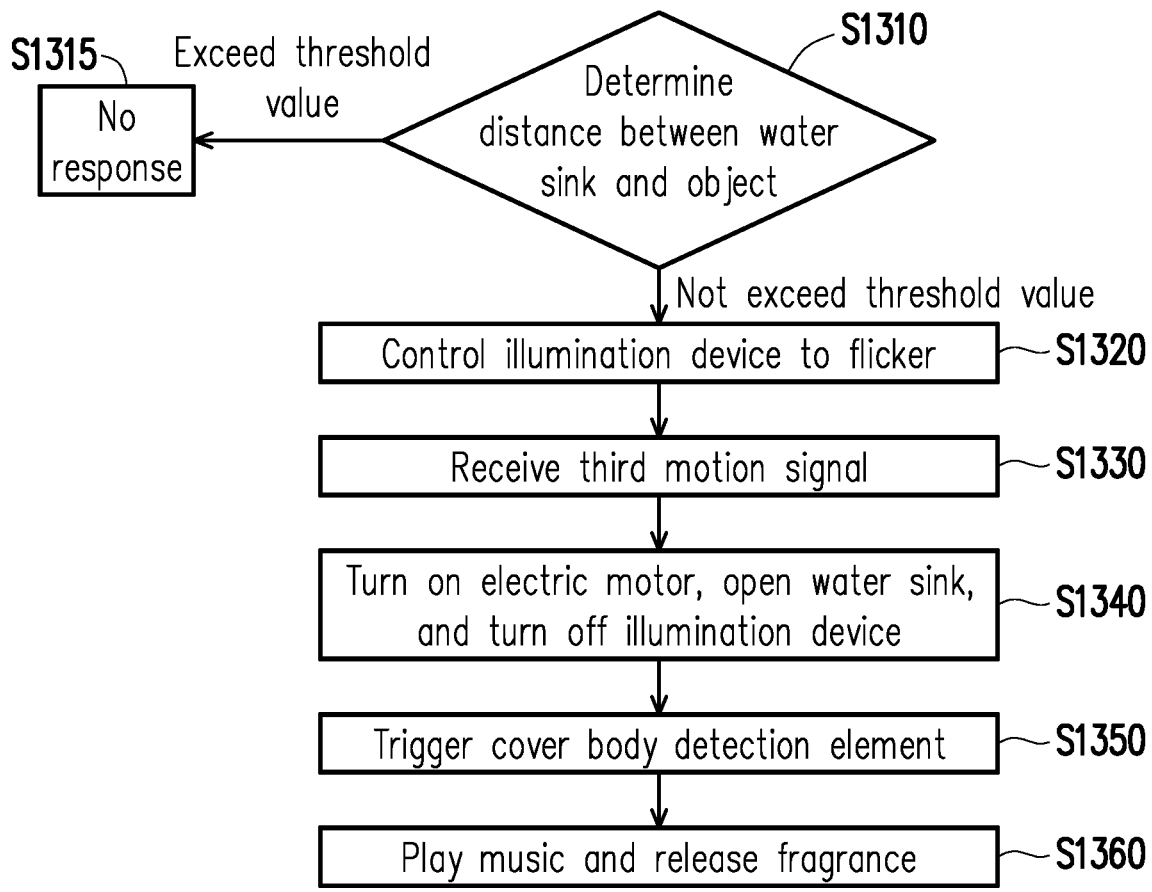
FIG. 13 is a flowchart illustrating a control method of the water sink according to the fourth embodiment of the disclosure.

FIG. 13 is a flowchart illustrating a control method of the water sink 4 according to the fourth embodiment of the disclosure. Referring to FIG. 13, the control circuit 50 controls the motion sensor 65 to determine a distance between the water sink 4 and an object according to a threshold value (step S1310). If the distance between the object and the water sink 4 exceeds the threshold value, the illumination device 70 has no response (i.e. remains closed or does not emit light) (step S1315). If the distance between the object and the water sink 4 does not exceed the threshold value, the control circuit 50 controls the illumination device 70 to remain in light or flicker (step S1320).

Figure 14A:
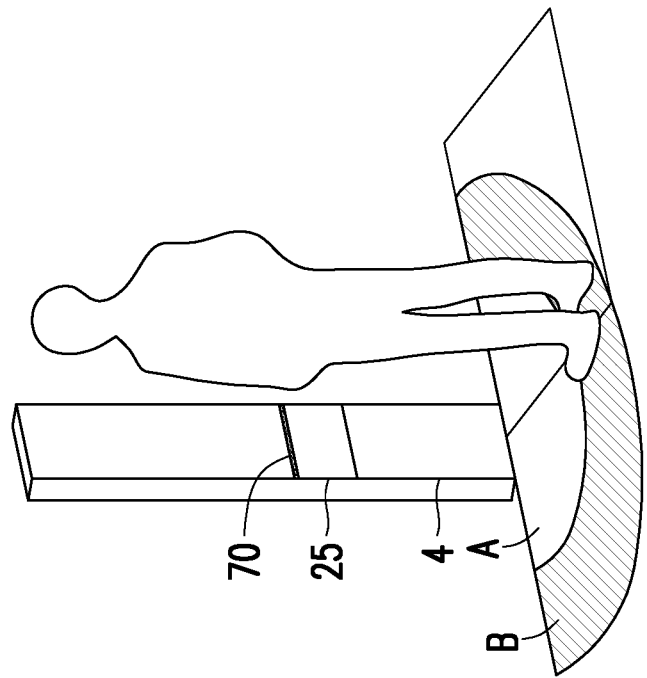
Figure 14B:
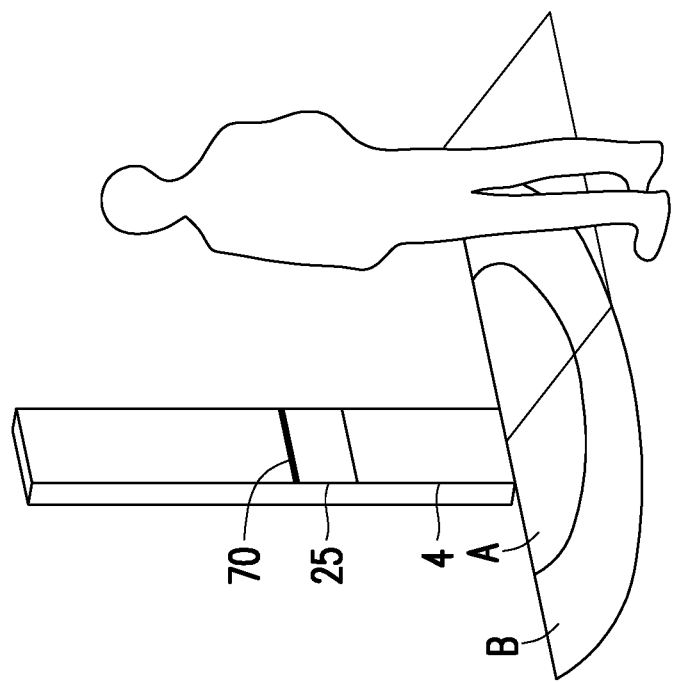

For example, FIGS. 14A to 14F are schematic diagrams of operating the water sink 4 according to the fourth embodiment of the disclosure. Referring to FIGS. 14A and 14B, the control circuit 50 sets a range A within 50 cm from the water sink 4, and a range B within 90 cm from the water sink 4. When the motion sensor 65 senses that there is no object within 90 cm from the water sink 4, the control circuit 50 turns off the illumination device 70 (shown in FIG. 14A). When the user moves to the range B, the motion sensor 65 senses an object within 50 to 90 cm from the water sink 4, and the control circuit 50 controls the illumination device 70 to flicker (as shown in FIG. 14B).

When the object is located within the range B, the motion sensor 65 detects a motion of the object (for example, hand waving, body moving, head shaking, etc.). The control circuit 50 receives a third motion/detection signal generated by the motion sensor 65 in response to the motion of the object (step S1330), and accordingly generates a control signal to turn on the electric motor 30 and turn off the illumination device 70, such that the outer cover 25 is opened (step S1340). It should be noted that, according to different movements, the control circuit 50 may drive the electric motor 30 in different manners (for example, outward or inward pushing, rightward rotating, upward outer cover opening, etc.).

Figure 14D:
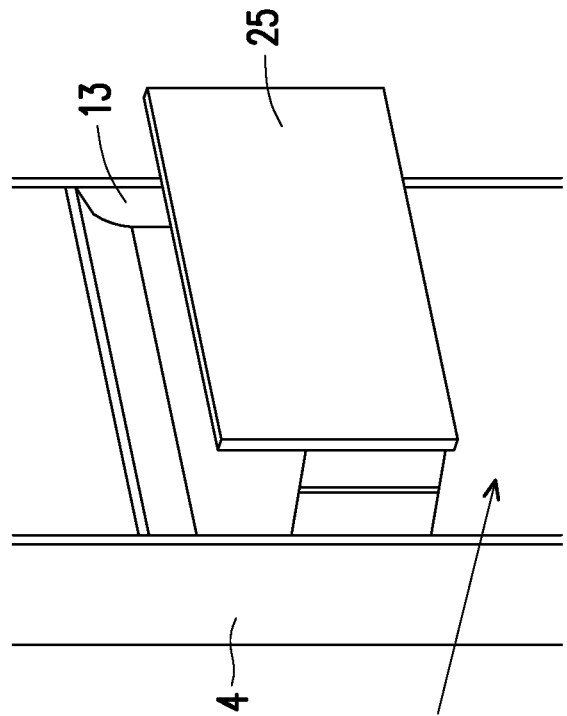
Figure 14C:
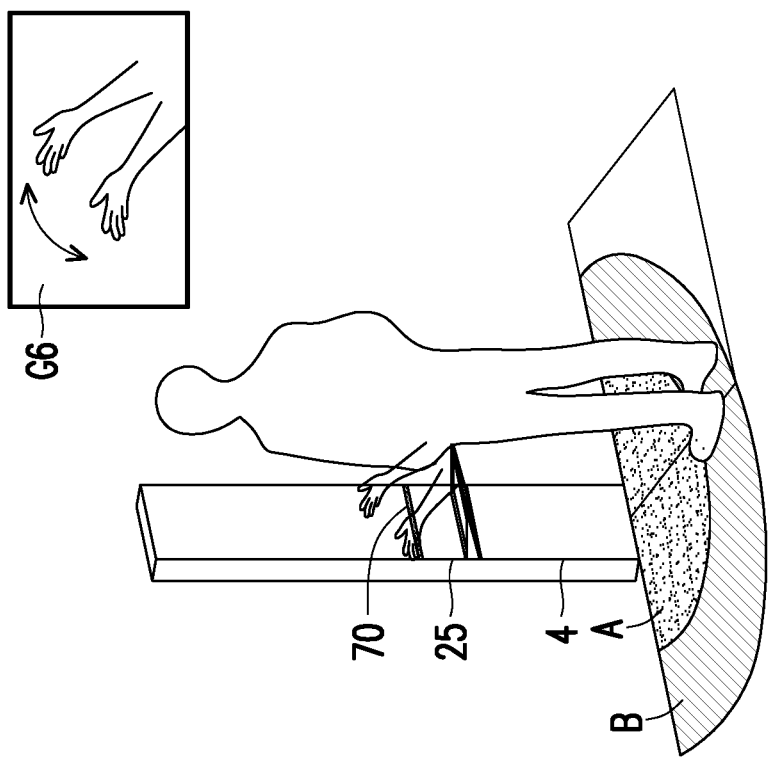

For example, referring to FIGS. 14C and 14D, when the motion sensor 65 detects that a gesture G6 of the user is to wave to left and right, the control circuit 50 controls the electric motor 30 to horizontally push out the outer cover 25 in an arrow direction shown in FIG. 14F according to a single-gesture waving signal generated by the motion sensor 65 in response to the gesture G6 waving to left and right, so as to facilitate the users hand stretching in through the opening 13. Since the outer cover 25 is pushed out when the water sink 4 is used, the water sink 4 may be hidden in a wall or a compartment of a room.

It should be noted that, the methods of opening the outer cover 25 are plural. For example, referring to FIGS. 14E and 14F, in response to the third motion signal, the outer cover 25 may be pivoted outward and pushed downward (as shown in FIG. 14E), or pivoted outward and pushed rightward to open (as shown in FIG. 14F).

On the other hand, the cover body detection element 80 is triggered as the cover body 20 (the outer cover 25) is moved to a specific position (a position P5 shown in FIG. 14D) (step S1350) (i.e. the cover body detection element 80 detects that the movement of the cover body 20 is to open the opening 13), so as to generate a cover body opening signal to the control circuit 50. The control circuit 50 may turn on the auxiliary device 40 according to the cover body opening signal, so as to continuously play music or sound through the loudspeaker 41 and spray the aromatic in a single or intermittent manner through the fragrance dispenser 42 (step S1360). Accordingly, the user may listen to music or sound and smell the aromatic, which enhances the atmosphere of using the toilet. The steps S1340-S1360 correspond to the first process.

In the second process, after the outer cover 25 is opened, the control circuit 50 may accordingly turn on the water supply device 85 to supply water into the main body 10. It should be noted that, the water supply situation at this moment belongs to self-cleaning of the water sink 4, which is different to the water supply situation for the user's use in following description.

In the water supply situation for the user's use, different gestures may be adopted to adjust the amount of water or turn off the water supply device. Moreover, in order to improve a visual experience, a virtual water flow image is presented through the display device 95.

Figure 15A:
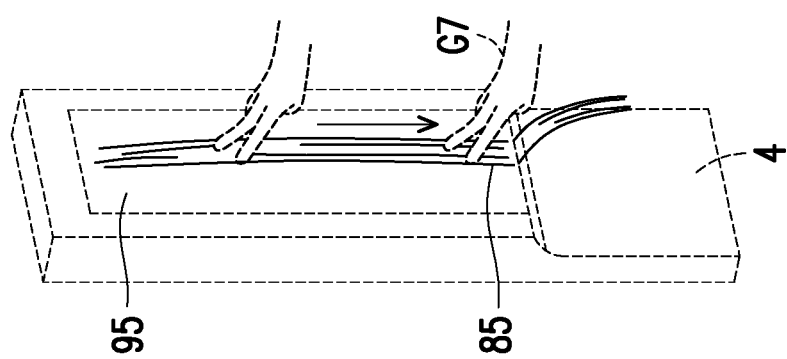
FIGS. 15A to 15D are schematic diagrams of controlling the water sink according to the fourth embodiment of the disclosure.
Figure 15B:
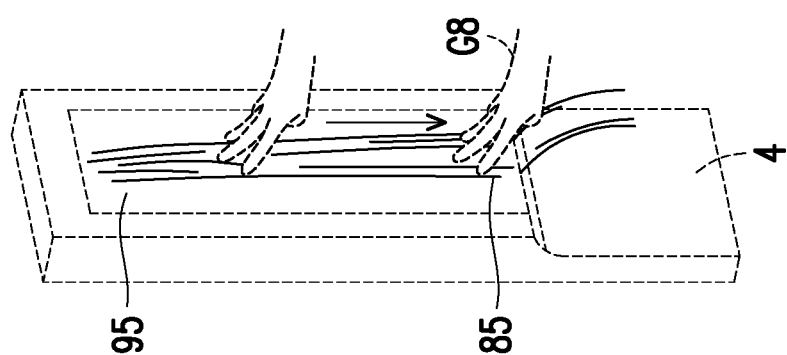

For example, FIGS. 15A to 15D are schematic diagrams of controlling the water sink 4 according to the fourth embodiment of the disclosure. Referring to FIG. 15A, when the motion sensor 65 detects that a gesture G7 of the user is to wave two fingers from top to bottom, the control circuit 50 controls the water supply device 85 to supply water according into a motion signal generated by the motion sensor 65 in response to the gesture G7 waving downward, and the display device 95 presents an image of water flowing downward. Referring to FIG. 15B, when the motion sensor 65 detects that a gesture G8 of the user is to wave three fingers from top to bottom, the control circuit 50 controls the water supply device 85 to supply water (with a water amount greater than that of FIG. 15A) according to a motion signal generated by the motion sensor 65 in response to the gesture G8 waving downward, and the display device 95 presents an image of more water flowing downward.

Figure 15C:
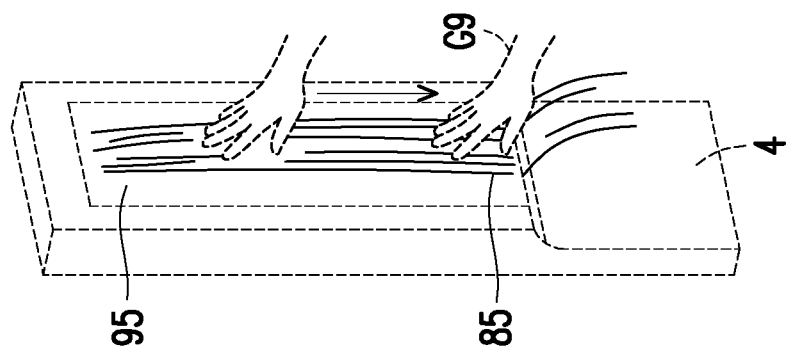
Figure 15D:
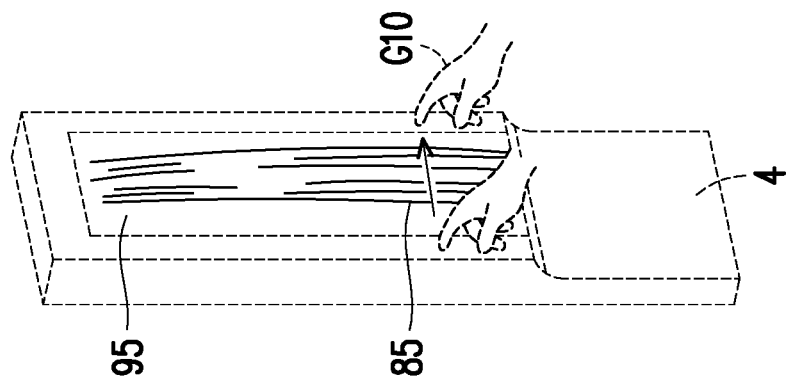

Referring to FIG. 15C, when the motion sensor 65 detects that a gesture G9 of the user is to wave five fingers from top to bottom, the control circuit 50 controls the water supply device 85 to supply water (with a water amount greater than that of FIG. 15B) according to a motion signal generated by the motion sensor 65 in response to the gesture G9 waving downward, and the display device 95 presents an image of more water flowing downward. Referring to FIG. 15D, when the motion sensor 65 detects that a gesture G10 of the user is to wave one finger from left to right, the control circuit 50 controls the water supply device 85 to stop supplying water according to a motion signal generated by the motion sensor 65 in response to the gesture G10 waving to the right. Then, the display device 95 does not present the image of water flowing downward. In this way, the user may enjoy animation during the process of using water, so as to improve the visual experience.

Figure 16:
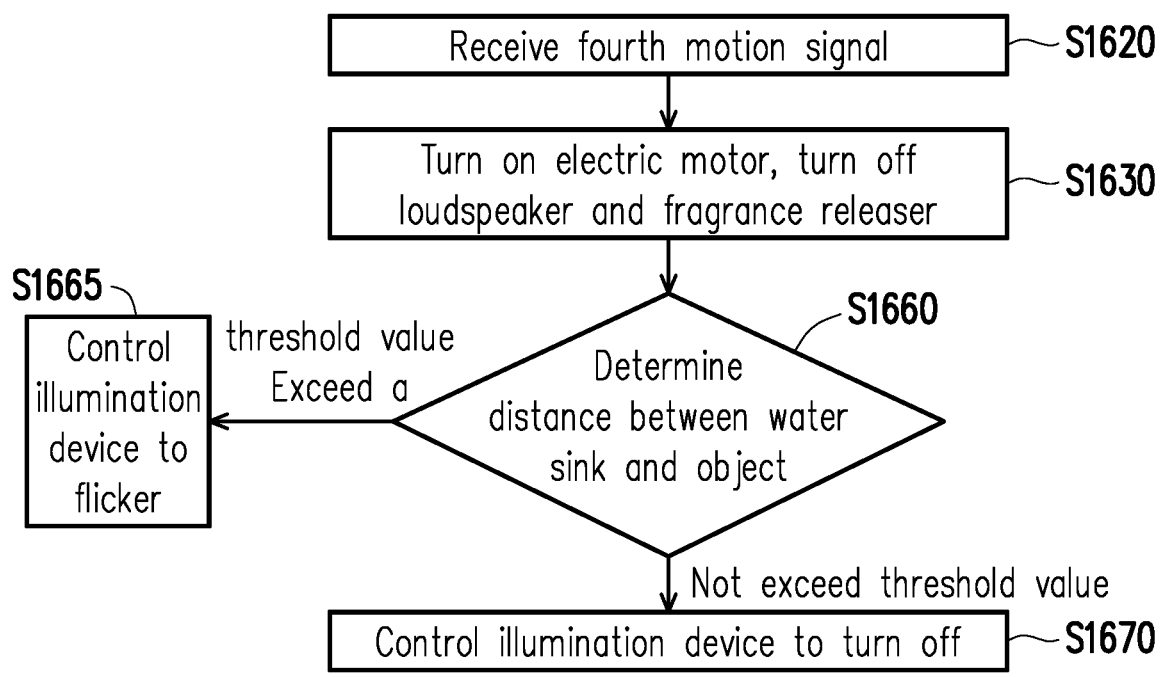
FIG. 16 is a flowchart illustrating a control method of the water sink according to the fourth embodiment of the disclosure.

FIG. 16 is a flowchart illustrating a control method of the water sink 4 according to the fourth embodiment of the disclosure. If the control circuit 50 receives a fourth motion/detection signal generated by the motion sensor 65 in response to motion of the user (step S1620), the control circuit 50 accordingly generates a control signal to control the electric motor 30 to reversely drive the outer cover 25 to close the opening 13, and meanwhile turn off the loudspeaker 41 (step S1630). The step S1630 corresponds to the second process.

Figure 17B:
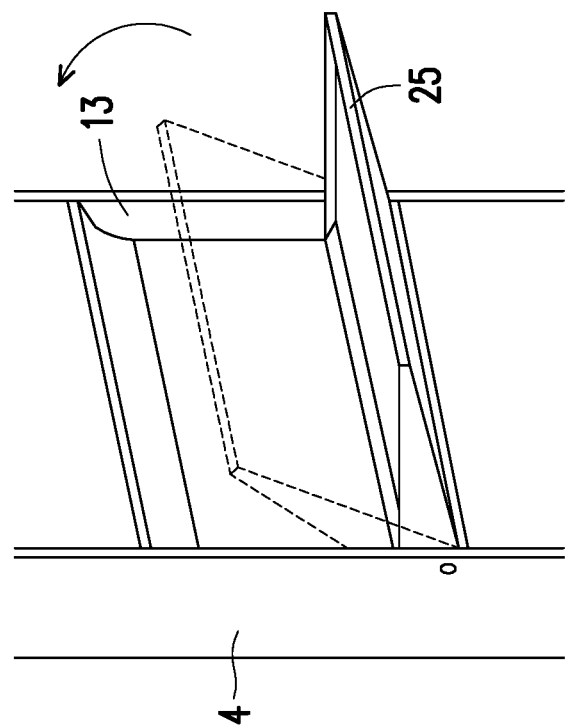
FIGS. 17A to 17D are schematic diagrams of operating the water sink according to the fourth embodiment of the disclosure.
Figure 17A:
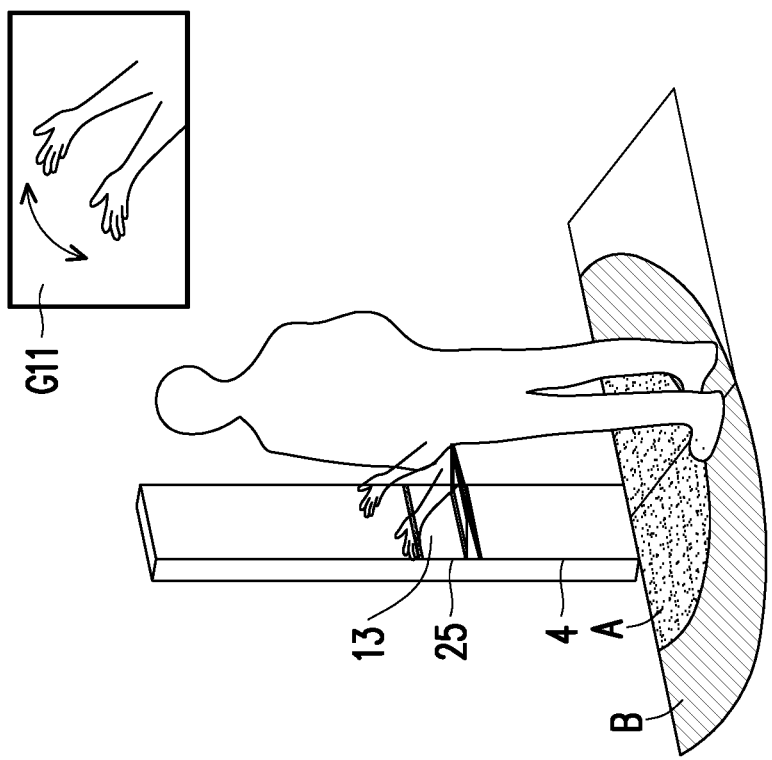

For example, FIGS. 17A to 17D are schematic diagrams of operating the water sink 4 according to the fourth embodiment of the disclosure. Referring to FIG. 17A, when the motion sensor 65 detects that a gesture G11 of the user is to wave from bottom to top, the control circuit 50 controls the electric motor 30 to rotate and close the outer cover 25 in an arrow direction shown in FIG. 17B according to a motion signal generated by the motion sensor 65 in response to the gesture G1 waving to the top. It should be noted that, in other exemplary embodiments, the electric motor 30 may also horizontally push the outer cover 25 backward, which may be changed according to a mechanism design of the outer cover 25.

Then, the control circuit 50 controls the motion sensor 65 to determine a distance between the object and the water sink 4 according to a threshold value (step S1660). If the distance between the object and the water sink 4 does not exceed the threshold value, the illumination device 70 remains in light or flickers (step S1665). If the distance between the object and the toilet 3 exceeds the threshold value, the control circuit 50 controls the illumination device 70 to turn off (or not to emit light) (step S1670).

Figure 17C:
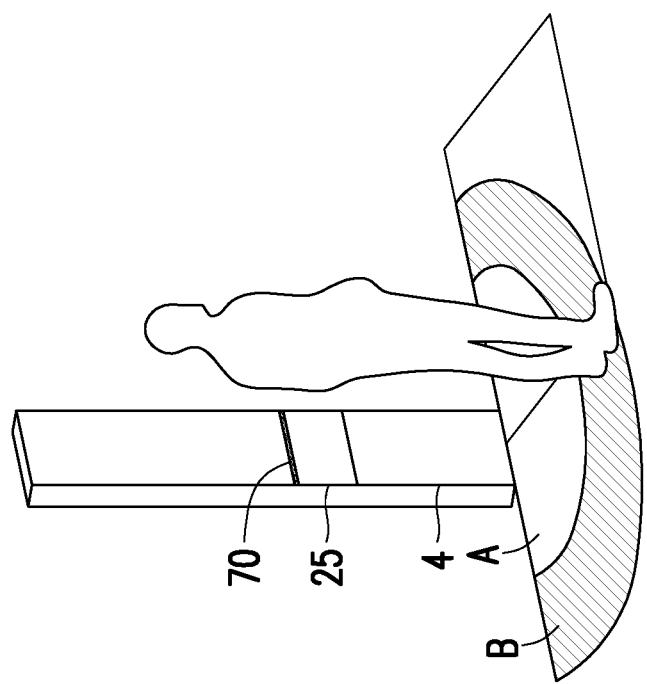
Figure 17D:
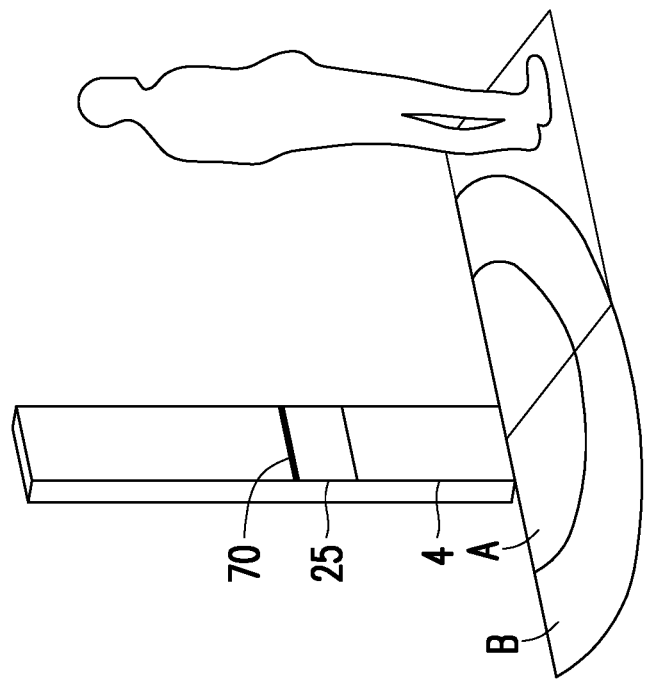

For example, referring to FIGS. 17C and 17D, when the motion sensor 65 senses that there is an object within 90 cm from the water sink 4, the control circuit 50 continuously turns on the illumination device 70 (as shown in FIG. 17C). When the user moves to the outside of the range B, the motion sensor 65 cannot sense an object within 50 to 90 cm from the water sink 4, and the control circuit 50 controls the illumination device 70 to turn off (as shown in FIG. 17D).

In summary, the sanitary equipment and the control method thereof in the embodiments of the disclosure have following characteristics. The cover body of the sanitary equipment adopts a horizontal open-close mode, so as to increase an accommodation space and improve a space usage rate. The sanitary equipment may be controlled through wireless remote control. The auxiliary device such as the loudspeaker, the fragrance dispenser, etc., may be used to improve a usage atmosphere. A turning on/off timing or open-close timing of the auxiliary device and the cover body is adjusted to avoid unnecessary resource waste. The motion sensor may be directly configured to the main body of the sanitary equipment, and the user is not required to install the same by himself. During the process that the user uses the sanitary equipment, the sensing operation of the motion sensor is disabled, so as to avoid miss touch of the user to improve usage safety. Toilet flushing is activated only after the cover body is closed, so as to avoid bacteria overflow along with water or avoid stink spreading. A water flushing amount may be adjusted according to an opening situation of the cover body, i.e. whether only the toile lid is opened or the toilet lid and the toilet seat are all opened. According to two different control gestures, it may be controlled to only open the toilet lid, or open the toilet lid and the toilet seat simultaneously/one-by-one, so as to provide the user with an intuitive operation. Moreover, after using of the toilet is completed, according to a single type of the control gesture and the opening situation of the cover body, it may be controlled to only close the toilet lid, or close the toilet lid and the toilet seat simultaneously/one-by-one, so that the user is unnecessary to perform multiple types or multiple operations.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A sanitary equipment, comprising:
   a main body, having an opening;
   at least one cover body, movably disposed on the main body, wherein the at least one cover body is at least one horizontal open-close cover body;
   an electric motor, adapted to drive the at least one cover body to move;
   at least one auxiliary device, disposed in the main body; and
   a control circuit, disposed in the main body, and coupled to the electric motor and the at least one auxiliary device;
      wherein the control circuit controls the electric motor to drive the at least one cover body to open the opening, and then turns on the at least one auxiliary device; and
      the control circuit controls the electric motor to drive the at least one cover body to close the opening, and meanwhile turns off the at least one auxiliary device.

2. The sanitary equipment as claimed in claim 1, further comprising:
   a wireless communication receiver, coupled to the control circuit, and configured to receive a wireless command signal.

3. The sanitary equipment as claimed in claim 2, wherein the wireless communication receiver generates a detection signal to the control circuit after receiving the wireless command signal.

4. The sanitary equipment as claimed in claim 1, further comprising:
   at least one motion sensor, coupled to the control circuit, and configured to detect a motion of an object.

5. The sanitary equipment as claimed in claim 4, wherein the at least one motion sensor generates a detection signal to the control circuit after detecting the motion of the object.

6. The sanitary equipment as claimed in claim 4, wherein the at least one motion sensor is disposed in the main body.

7. The sanitary equipment as claimed in claim 1, wherein the at least one horizontal open-close cover body is at least one rotary cover body or at least one sliding cover body.

8. The sanitary equipment as claimed in claim 1, further comprising:
   a cover body detection element, coupled to the control circuit, and configured to detect movement of the at least one cover body.

9. The sanitary equipment as claimed in claim 8, wherein the cover body detection element generates a cover body moving signal to the control circuit after detecting the movement of the at least one cover body.

10. The sanitary equipment as claimed in claim 1, further comprising:
    a pressure sensor, coupled to the control circuit, and configured to detect an external force on the at least one cover body.

11. The sanitary equipment as claimed in claim 10, wherein the pressure sensor generates a pressure sensing value to the control circuit after detecting the external force on the cover body.

12. The sanitary equipment as claimed in claim 1, wherein the at least one auxiliary device comprises at least one of a fragrance dispenser and a loudspeaker.

13. The sanitary equipment as claimed in claim 1, further comprising:
    a water supply device, coupled to the control circuit, and configured to supply water into the main body.

14. The sanitary equipment as claimed in claim 1, further comprising:
    a disinfection device, coupled to the control circuit.

15. The sanitary equipment as claimed in claim 1, wherein the at least one cover body comprises a toilet lid and a toilet seat.

16. The sanitary equipment as claimed in claim 6, wherein a range of an included angle between a detection direction of the at least one motion sensor and a ground vertical line is 10-80 degrees.

17. The sanitary equipment as claimed in claim 14, wherein the at least one cover body comprises a toilet lid and a toilet seat, and the disinfection device is disposed in the toilet lid.

18. The sanitary equipment as claimed in claim 17, wherein when the opening is closed by the toilet lid and the toilet seat, the disinfection device faces the toilet seat.

19. The sanitary equipment as claimed in claim 18, wherein the disinfection device is an ultraviolet disinfection lamp.

20. The sanitary equipment as claimed in claim 12, wherein the at least one fragrance dispenser is an oily fragrance dispenser configured to provide an oily aromatic film on a water surface inside the main body.

* * * * *